United States Patent
Niemasik et al.

(10) Patent No.: US 8,195,582 B2
(45) Date of Patent: Jun. 5, 2012

(54) SUPERVISION BASED GROUPING OF PATTERNS IN HIERARCHICAL TEMPORAL MEMORY (HTM)

(75) Inventors: James Niemasik, San Francisco, CA (US); Dileep George, Menlo Park, CA (US)

(73) Assignee: Numenta, Inc., Redwood City, CA (US)

( * ) Notice: Subject to any disclaimer, the term of this patent is extended or adjusted under 35 U.S.C. 154(b) by 688 days.

(21) Appl. No.: 12/355,679

(22) Filed: Jan. 16, 2009

(65) Prior Publication Data

US 2010/0185567 A1     Jul. 22, 2010

(51) Int. Cl.
G06F 15/18     (2006.01)
(52) U.S. Cl. .......................................................... 706/12
(58) Field of Classification Search .................. None
See application file for complete search history.

(56) References Cited

U.S. PATENT DOCUMENTS

| | | | |
|---|---|---|---|
| 4,766,534 A | 8/1988 | DeBenedictis | |
| 4,845,744 A | 7/1989 | DeBenedictis | |
| 5,255,348 A | 10/1993 | Nenov | |
| 5,712,953 A | 1/1998 | Langs | |
| 6,028,608 A * | 2/2000 | Jenkins | 345/619 |
| 6,122,014 A | 9/2000 | Panusopone et al. | |
| 6,195,622 B1 | 2/2001 | Altschuler et al. | |
| 6,400,996 B1 | 6/2002 | Hoffberg et al. | |
| 6,468,069 B2 | 10/2002 | Lemelson et al. | |
| 6,567,814 B1 | 5/2003 | Banker et al. | |
| 6,625,585 B1 | 9/2003 | MacCuish et al. | |
| 6,714,941 B1 | 3/2004 | Lerman et al. | |
| 6,751,343 B1 | 6/2004 | Ferrell et al. | |
| 6,957,241 B2 | 10/2005 | George | |
| 7,088,693 B2 | 8/2006 | George | |
| 7,251,637 B1 | 7/2007 | Caid et al. | |
| 7,739,208 B2 | 6/2010 | George et al. | |
| 7,826,990 B2 | 11/2010 | Nasle et al. | |
| 7,840,395 B2 | 11/2010 | Nasle et al. | |

(Continued)

FOREIGN PATENT DOCUMENTS

EP     1557990 A     7/2005

(Continued)

OTHER PUBLICATIONS

Ahmad, S., "NuPIC Jumpstart—Part II," Numenta®, May 2008, Numenta HTM Workshop, Jun. 23-24, 2008, SRI Campus, Menlo Park, CA, 34 pages.

(Continued)

*Primary Examiner* — Jeffrey A Gaffin
*Assistant Examiner* — Paulinho E Smith
(74) *Attorney, Agent, or Firm* — Fenwick & West LLP

(57) ABSTRACT

A HTM network that uses supervision signals such as indexes for correct categories of the input patterns to group the co-occurrences detected in the node. In the training mode, the supervised learning node receives the supervision signals in addition to the indexes or distributions from children nodes. The supervision signal is then used to assign the co-occurrences into groups. The groups include unique groups and nonunique groups. The co-occurrences in the unique group appear only when the input data represent certain category but not others. The nonunique groups include patterns that are shared by one or more categories. In an inference mode, the supervised learning node generates distributions over the groups created in the training mode. A top node of the HTM network generates an output based on the distributions generated by the supervised learning node.

21 Claims, 10 Drawing Sheets

U.S. PATENT DOCUMENTS

| | | | |
|---|---|---|---|
| 7,840,396 B2 | 11/2010 | Radibratovic et al. | |
| 7,844,439 B2 | 11/2010 | Nasle et al. | |
| 7,844,440 B2 | 11/2010 | Nasle et al. | |
| 7,899,775 B2 * | 3/2011 | George et al. | 706/52 |
| 7,904,412 B2 * | 3/2011 | Saphir et al. | 706/52 |
| 7,937,342 B2 | 5/2011 | George et al. | |
| 7,941,392 B2 * | 5/2011 | Saphir | 706/52 |
| 7,983,998 B2 * | 7/2011 | George et al. | 706/12 |
| 8,037,010 B2 * | 10/2011 | Jaros et al. | 706/62 |
| 8,112,367 B2 * | 2/2012 | George et al. | 706/12 |
| 2002/0150044 A1 | 10/2002 | Wu et al. | |
| 2002/0161736 A1 | 10/2002 | Beygelzimer et al. | |
| 2003/0069002 A1 | 4/2003 | Hunter et al. | |
| 2003/0123732 A1 | 7/2003 | Miyazaki et al. | |
| 2003/0167111 A1 | 9/2003 | Kipersztok et al. | |
| 2004/0002838 A1 | 1/2004 | Oliver et al. | |
| 2004/0142325 A1 * | 7/2004 | Mintz et al. | 435/6 |
| 2004/0148520 A1 | 7/2004 | Talpade et al. | |
| 2004/0267395 A1 | 12/2004 | Discenzo et al. | |
| 2005/0063565 A1 | 3/2005 | Nagaoka et al. | |
| 2005/0190990 A1 | 9/2005 | Burt et al. | |
| 2005/0222811 A1 | 10/2005 | Jakobson et al. | |
| 2006/0161736 A1 * | 7/2006 | Huang | 711/137 |
| 2006/0184462 A1 | 8/2006 | Hawkins | |
| 2006/0212444 A1 | 9/2006 | Handman et al. | |
| 2006/0235320 A1 | 10/2006 | Tan et al. | |
| 2006/0248026 A1 | 11/2006 | Aoyama et al. | |
| 2006/0248073 A1 | 11/2006 | Jones et al. | |
| 2006/0253491 A1 | 11/2006 | Gokturk et al. | |
| 2006/0259163 A1 | 11/2006 | Hsiung et al. | |
| 2007/0005531 A1 | 1/2007 | George et al. | |
| 2007/0192264 A1 | 8/2007 | Hawkins et al. | |
| 2007/0192267 A1 | 8/2007 | Hawkins et al. | |
| 2007/0192268 A1 | 8/2007 | Hawkins et al. | |
| 2007/0192269 A1 | 8/2007 | Saphir et al. | |
| 2007/0192270 A1 | 8/2007 | Hawkins et al. | |
| 2007/0228703 A1 | 10/2007 | Breed | |
| 2007/0276744 A1 * | 11/2007 | Burke | 705/35 |
| 2007/0276774 A1 | 11/2007 | Ahmad et al. | |
| 2008/0059389 A1 | 3/2008 | Jaros et al. | |
| 2008/0208966 A1 * | 8/2008 | Edwards et al. | 709/203 |
| 2009/0006289 A1 | 1/2009 | Jaros et al. | |
| 2009/0013041 A1 | 1/2009 | Farmer et al. | |
| 2009/0313193 A1 | 12/2009 | Hawkins et al. | |
| 2010/0049677 A1 * | 2/2010 | Jaros et al. | 706/12 |
| 2010/0207754 A1 | 8/2010 | Shostak et al. | |
| 2011/0231351 A1 * | 9/2011 | George et al. | 706/12 |

FOREIGN PATENT DOCUMENTS

| | | |
|---|---|---|
| WO | WO 2006/063291 A | 6/2006 |
| WO | WO 2008/067326 A2 | 6/2008 |
| WO | WO 2009/006231 A | 1/2009 |

OTHER PUBLICATIONS

Ahmad, S. et al., "PowerNuPIC," Numenta®, Jun. 2008, Numenta HTM Workshop, Jun. 23-24, 2008, SRI Campus, Menlo Park, CA, 57 pages.

Biancaniello, P. et al., Multimodal Pattern Recognition with Hierarchical Temporal Memory (MPR), Lockheed Martin Brain-Inspired Computing Research Overview, Numenta HTM Workshop, Jun. 2008, 12 pages.

Bobier, B., "Content-Based Image Retrieval Using Hierarchical Temporal Memory," Numenta HTM Workshop, Jun. 23-24, 2008, SRI Campus, Menlo Park, CA, 7 pages.

Curry, C. et al., "Speech Processing with HTM," Numenta®, Jun. 2008, Numenta HTM Workshop, Jun. 23-24, 2008, SRI Campus, Menlo Park, CA, 57 pages.

Dubinsky, D., "Numenta Business Strategy," Numenta®, Jun. 2008, Numenta HTM Workshop, Jun. 23-24, 2008, SRI Campus, Menlo Park, CA, 15 pages.

"EDSA Project Information," Numenta®, Apr. 2008, Numenta HTM Workshop, Jun. 23-24, 2008, SRI Campus, Menlo Park, CA, 4 pages.

Eswaran, K., "Numenta Lightning Talk on Dimension Reduction and Unsupervised Learning," Numenta HTM Workshop, Jun. 23-24, 2008, SRI Campus, Menlo Park, CA, 30 pages.

Finley, M., "Exploration of Motion Capture," Qualia Labs, Jun. 24, 2008, Numenta HTM Workshop, Jun. 23-24, 2008, SRI Campus, Menlo Park, CA, 36 pages.

George, D. et al., "The HTM Learning Algorithm," [Online] [Retrieved on Jan. 1, 2009] Retrieved from the Internet<URL:http://www.numenta.com/for-developers/education/Numenta_HTM_Learning_Algos.pdf>.

Haitani, R. et al., "Vitamin D Toolkit, Introduction," Jun. 24, 2008, Numenta HTM Workshop, Jun. 23-24, 2008, SRI Campus, Menlo Park, CA, 11 pages.

"HTM Algorithms," Numenta®, Jun. 2008, Numenta HTM Workshop, Jun. 23-24, 2008, SRI Campus, Menlo Park, CA, 67 pages.

"HTM Optimized Drug Therapy," SDSytem24.com, Numenta HTM Workshop, Jun. 23-24, 2008, SRI Campus, Menlo Park, CA, 7 pages.

"HTM Workshop, Jumpstart," Numenta®, Jun. 2008, Numenta HTM Workshop, Jun. 23-24, 2008, SRI Campus, Menlo Park, CA, 86 pages.

Levinson, S. et al., "Automatic Language Acquisition for a Mobile Robot," Feb. 2005, Numenta HTM Workshop, Jun. 23-24, 2008, SRI Campus, Menlo Park, CA, 27 pages.

McDowell, C. et al., "SlugGo, a Computer Go Program," Numenta HTM Workshop, Jun. 23-24, 2008, SRI Campus, Menlo Park, CA, 18 pages.

PCT International Search Report and Written Opinion, PCT Application No. PCT/US2009/047250, Sep. 25, 2009, 13 pages.

"Problem Solving with HTMs," Numenta®, Jun. 2008, Numenta HTM Workshop, Jun. 23-24, 2008, SRI Campus, Menlo Park, CA, 23 pages.

Ross, L., "Discovering and Using Patterns in Plant Floor Data," Numenta HTM Workshop, Jun. 23-24, 2008, SRI Campus, Menlo Park, CA, 12 pages.

Saphir, B., "Power NuPIC Part II, How to Create a New Node Type," Numenta®, Jun. 2008, Numenta HTM Workshop, Jun. 23-24, 2008, SRI Campus, Menlo Park, CA, 32 pages.

U.S. Office Action, U.S. Appl. No. 11/622,456, Mar. 20, 2009, 9 pages.

U.S. Office Action, U.S. Appl. No. 11/622,456, Nov. 6, 2008, 7 pages.

U.S. Office Action, U.S. Appl. No. 11/622,456, May 7, 2008, 14 pages.

U.S. Office Action, U.S. Appl. No. 11/622,454, Mar. 30, 2009, 11 pages.

U.S. Office Action, U.S. Appl. No. 11/622,454, Jun. 3, 2008, 13 pages.

U.S. Office Action, U.S. Appl. No. 11/622,457, Apr. 21, 2009, 6 pages.

U.S. Office Action, U.S. Appl. No. 11/622,457, Nov. 20, 2008, 8 pages.

U.S. Office Action, U.S. Appl. No. 11/622,457, May 6, 2008, 14 pages.

U.S. Office Action, U.S. Appl. No. 11/622,457, Aug. 24, 2007, 10 pages.

U.S. Office Action, U.S. Appl. No. 11/147,069, Jul. 29, 2009, 43 pages.

U.S. Office Action, U.S. Appl. No. 11/147,069, Jan. 9, 2009, 38 pages.

U.S. Office Action, U.S. Appl. No. 11/147,069, May 15, 2008, 37 pages.

U.S. Office Action, U.S. Appl. No. 11/147,069, Oct. 30, 2007, 34 pages.

U.S. Office Action, U.S. Appl. No. 11/147,069, May 29, 2007, 36 pages.

U.S. Office Action, U.S. Appl. No. 11/147,069, Jan. 9, 2007, 27 pages.

Vaught, T.N., "Software Design in Scientific Computing," Jun. 23, 2008, Numenta HTM Workshop, Jun. 23-24, 2008, SRI Campus, Menlo Park, CA, 32 pages.

"Vision Framework," Numenta®, Jun. 2008, Numenta HTM Workshop, Jun. 23-24, 2008, SRI Campus, Menlo Park, CA, 36 pages.

Dean, T., "Learning Invariant Features Using Inertial Priors," *Annals of Mathematics and Artificial Intelligence*, 2006, pp. 223-250, vol. 47.

Adelson, E.H. et al., "The Perception of Shading and Reflectance," Perception as Bayesian Inference, Knill, D.C. et al., ed., 1996, pp. 409-423, Cambridge University Press, UK.

Agrawal, R. et al., "Mining Sequential Patterns," IEEE, 1995, pp. 3-14.

Archive of "Numenta Platform for Intelligent Computing Programmer's Guide," Numenta, Mar. 7, 2007, pp. 1-186, www.numenta.com, [Online] Archived by http://archive.org on Mar. 19, 2007; Retrieved on Aug. 13, 2008] Retrieved from the Internet<URL:http://web.archive.org/web/20070319232606/http://www.numenta.com/for-developers/software/pdf/nupic_prog_guide.pdf>.

Becerra, J.A. et al., "Multimodule Artificial Neural Network Architectures for Autonomous Robot Control Through Behavior Modulation," IWANN 2003, LNCS, J. Mira (Ed.), pp. 169-176, vol. 2687, Springer-Verlag.

Csapo, A.B. et al., "Object Categorization Using VFA-Generated Nodemaps and Hierarchical Temporal Memories," IEEE International Conference on Computational Cybernetics, IEEE, Oct. 7, 2007, pp. 257-262.

Demeris, Y. et al., "From Motor Babbling to Hierarchical Learning by Imitation: A Robot Developmental Pathway," Proceedings of the Fifth International Workshop on Epigenetic Robotics: Modeling Cognitive Development in Robotic Systems, 2005, pp. 31-37.

Ding, C.H.Q., "Cluster Merging and Splitting in Hierarchical Clustering Algorithms," Proceedings of the 2002 IEEE International Conference on Data Mining (ICDM 2002), Dec. 9, 2002, pp. 139-146.

European Examination Report, European Application No. 05853611.1, Jun. 23, 2008, 4 pages.

European Examination Report, European Application No. 07750385.2, Apr. 21, 2009, 8 pages.

Felleman, D.J. et al., "Distributed Hierarchical Processing in the Primate Cerebral Cortex," Cerebral Cortex, Jan./Feb. 1991, pp. 1-47, vol. 1.

Fine, S. et al., "The Hierarchical Hidden Markov Model: Analysis and Applications," Machine Learning, Jul. 1998, pp. 41-62, vol. 32.

Foldiak, P., "Learning Invariance from Transformation Sequences," Neural Computation, 1991, pp. 194-200, vol. 3, No. 2.

Fukushima, K., "Neocognitron: A Self-Organizing Neural Network Model for a Mechanism of Pattern Recognition Unaffected by Shift in Position," Biol. Cybernetics, 1980, pp. 193-202, vol. 36.

George, D. et al., "A Hierarchical Bayesian Model of Invariant Pattern Recognition in the Visual Cortex," Mar. 2005.

George, D. et al., "Invariant Pattern Recognition Using Bayesian Inference on Hierarchical Sequences," Technical Report, Oct. 2004, pp. 1-8.

George, D. et al., "A Hierarchical Bayesian Model of Invariant Pattern Recognition in the Visual Cortex," Proceedings, 2005 IEEE International Joint Conference on Neural Networks, Jul. 31-Aug. 4, 2005, pp. 1812-1817, vol. 3.

Gottschalk, K. et al., "Introduction to Web Services Architecture," IBM Systems Journal, 2002, pp. 170-177, vol. 41, No. 2.

Guinea, D. et al., "Robot Learning to Walk: An Architectural Problem for Intelligent Controllers," Proceedings of the 1993 International Symposium on Intelligent Control, Chicago, IL, IEEE, Aug. 1993, pp. 493-498.

Guo, C-E. et al., "Modeling Visual Patterns by Integrating Descriptive and Generative Methods," International Journal of Computer Vision, May 29, 2003, 28 pages, vol. 53, No. 1.

Han, K. et al., "Automated Robot Behavior Recognition Applied to Robotic Soccer," In Proceedings of the IJCAI-99 Workshop on Team Behaviors and Plan Recognition, 1999, 6 pages.

Hasegawa, Y. et al., "Learning Method for Hierarchical Behavior Controller," Proceedings of the 1999 IEEE International Conference on Robotics & Automation, May 1999, pp. 2799-2804.

Hawkins, J. et al., "Hierarchical Temporal Memory Concepts, Theory and Terminology," Numenta, Jan. 27, 2007, pp. 1-20.

Hawkins, J. et al., "Hierarchical Temporal Memory Concepts, Theory and Terminology," Numenta, Mar. 27, 2007 [Online] [Retrieved on Oct. 7, 2008] Retrieved from the Internet<URL:http://www.numenta.com/Numenta_HTM_Concepts.pdf>.

Hawkins, J. et al., "Hierarchical Temporal Memory Concepts, Theory and Terminology," Numenta, May 10, 2006 [Online] [Retrieved on Jul. 16, 2008] Retrieved from the Internet<URL:http://www.neurosecurity.com/whitepapers/Numenta_HTM_Concepts.pdf>.

Hawkins, J. et al., "On Intelligence," Sep. 2004, pp. 23-29, 106-174, 207-232, Times Books, Henry Holt and Company, New York, NY 10011.

Hawkins, J., "Why Can't a Computer Be More Like a Brain?" IEEE Spectrum, Apr. 1, 2007, pp. 21-26, vol. 44, No. 4, IEEE Inc., New York, US.

Hernandez-Gardiol, N. et al., "Hierarchical Memory-Based Reinforcement Learning," Proceedings of Neural Information Processing Systems, 2001, 7 pages.

Hinton, G.E. et al., "The "Wake-Sleep" Algorithm for Unsupervised Neural Networks," Science, May 26, 1995, pp. 1158-116, vol. 268.

Hoey, J., "Hierarchical Unsupervised Learning of Facial Expression Categories," 2001, IEEE, 0-7695-1293-3, pp. 99-106.

Hyvarinen, A. et al., "Bubbles: A Unifying Framework for Low-Level Statistical Properties of Natural Image Sequences," J. Opt. Soc. Am. A., 2003, pp. 1237-1252, vol. 20, No. 7.

International Search Report and Written Opinion, International Application No. PCT/US2007/003544, Jun. 16, 2008, 14 pages.

International Search Report and Written Opinion, International Application No. PCT/US2005/044729, May 14, 2007, 14 pages.

International Search Report and Written Opinion, International Application No. PCT/US07/85661, Jun. 13, 2008, 7 pages.

International Search Report and Written Opinion, International Application No. PCT/US08/55389, Jul. 25, 2008, 8 pages.

International Search Report and Written Opinion, International Application No. PCT/US08/55352, Aug. 1, 2008, 8 pages.

International Search Report and Written Opinion, International Application No. PCT/US2008/054631, Aug. 18, 2008, 14 pages.

International Search Report and Written Opinion, International Application No. PCT/US2008/068435, Oct. 31, 2008, 14 pages.

International Search Report and Written Opinion, International Application No. PCT/US2009/035193, Apr. 22, 2009, 14 pages.

Isard, M. et al., "Icondensation: Unifying Low-Level and High-Level Tracking in a Stochastic Framework," Lecture Notes in Computer Science 1406, Burkhardt, H. et al., ed., 1998, pp. 893-908, Springer-Verlag, Berlin.

Lee, T.S. et al., "Hierarchical Bayesian Inference in the Visual Cortex," Journal of the Optical Society of America, Opt. Image. Sci. Vis., Jul. 7, 2003, pp. 1434-1448, vol. 20, No. 7.

Lenser, S. et al., "A Modular Hierarchical Behavior-Based Architecture," RoboCup 2001, LNAI 2377, 2002, Birk, A. et al, (Eds.), pp. 423-428, Springer-Verlag, Berlin, Heidelberg.

Lewicki, M.S. et al., "Bayesian Unsupervised Learning of Higher Order Structure," Moser, M.C. et al., ed., Proceedings of the 1996 Conference in Advances in Neural Information Processing Systems 9, 1997, pp. 529-535.

Murphy, K. et al., "Using the Forest to See the Trees: A Graphical Model Relating Features, Objects and Scenes," Advances in Neural Processing System, 2004, vol. 16.

Murray, S.O. et al., "Shaper Perception Reduces Activity in Human Primary Visual Cortex," Proceedings of the Nat. Acad. of Sciences of the USA, Nov. 2002, pp. 15164-151169, vol. 99, No. 23.

"Numenta Node Algorithms Guide NuPIC 1.6," Numenta, Jun. 13, 2008, pp. 1-6.

"Numenta Node Algorithms Guide NuPIC 1.6," Numenta, Jul. 22, 2008, pp. 1-7.

Olshausen, B.A. et al., "A Neurobiological Model of Visual Attention and Invariant Pattern Recognition Based on Dynamic Routing Information," Jnl. of Neuroscience, Nov. 1993.

Pearl, J., "Probabilistic Reasoning in Intelligent Systems: Networks of Plausible Inference," 1988, pp. 143-223, Morgan Kaufmann Publishers, Inc.

Riesenhuber, M. et al., "Hierarchical Models of Object Recognition in Cortex," Nature Neuroscience, Nov. 1999, pp. 1019-1025, vol. 2, No. 11.

Sinha, P. et al., "Recovering Reflectance and Illumination in a World of Painted Polyhedra," Fourth International Conference on Computer Vision, Berlin, May 11-14, 1993, pp. 156-163, IEEE Computer Society Press, Los Alamitos, CA.

Stringer, S.M. et al., "Invariant Object Recognition in the Visual System with Novel Views of 3D Objects," Neural Computation, Nov. 2002, pp. 2585-2596, vol. 14, No. 11.
Sudderth, E.B. et al., "Nonparametric Belief Propagation and Facial Appearance Estimation," AI Memo 2002-020, Dec. 2002, pp. 1-10, Artificial Intelligence Laboratory, Massachusetts Institute of Technology, Cambridge, MA.
Thomson, A.M. et al., "Interlaminar Connections in the Neocortex," Cerebral Cortex, 2003, pp. 5-14, vol. 13, No. 1.
Tsukada, M, "A Theoretical Model of the Hippocampal-Cortical Memory System Motivated by Physiological Functions in the Hippocampus", Proceedings of the 1993 International Joint Conference on Neural Networks, Oct. 25, 1993, pp. 1120-1123, vol. 2, Japan.
Van Essen, D.C. et al., "Information Processing Strategies and Pathways in the Primate Visual System," An Introduction to Neural and Electronic Networks, 1995, $2^{nd}$ ed.
Vlajic, N. et al., "Vector Quantization of Images Using Modified Adaptive Resonance Algorithm for Hierarchical Clustering", IEEE Transactions on Neural Networks, Sep. 2001, pp. 1147-1162, vol. 12, No. 5.
Wiskott, L. et al., "Slow Feature Analysis: Unsupervised Learning of Invariances," Neural Computation, 2002, pp. 715-770, vol. 14, No. 4.
Yedidia, J.S. et al., "Understanding Belief Propagation and its Generalizations," Joint Conference on Artificial Intelligence (IJCAI 2001), Seattle, WA, Aug. 4-10, 2001, 35 pages.
Zemel, R.S., "Cortical Belief Networks," Computational Models for Neuroscience, Hecht-Nielsen, R. et al., ed., 2003, pp. 267-287, Springer-Verlag, New York.
"Zeta1 Algorithms Reference, Version 1.0," Numenta Inc., Mar. 1, 2007, pp. 1-36.
"Zeta1 Algorithms Reference, Version 1.2," Numenta Inc., Jun. 8, 2007, pp. 1-38.
"Zeta1 Algorithms Reference, Version 1.3," Numenta Inc., Aug. 22, 2007, pp. 1-41.
"Zeta1 Algorithms Reference, Version 1.5," Numenta Inc., Aug. 24, 2007, pp. 1-45.
Fine, S. et al., "The Hierarchical Hidden Markov Model: Analysis and Applications," Machine Learning, 1998, pp. 41-62, vol. 32, Kluwer Academic Publishers, Boston.
Kuenzer, A. et al., "An Empirical Study of Dynamic Bayesian Networks for User Modeling," Proc. of the UM 2001 Workshop on Machine Learning, pages.
Colombe, J., "A Survey of Recent Developments in Theoretical Neuroscience and Machine Vision," *Proceedings of the IEEE Applied Imagery Pattern Recognition Workshop*, 2003, nine pages.
Farahmand, N. et al., "Online Temporal Pattern Learning," *Proceedings of the International Joint Conference on Neural Networks*, Jun. 14-19, 2009, pp. 797-802, Atlanta, GA, USA.
Lo, J. "Unsupervised Hebbian Learning by Recurrent Multilayer Neural Networks for Temporal Hierarchical Pattern Recognition," *Information Sciences and Systems 44th Annual Conference on Digital Object Identifier*, 2010, pp. 1-6.
Mannes, C., "A Neural Network Model of Spatio-Temporal Pattern Recognition, Recall and Timing," Technical Report CAS/CNS-92-013, Feb. 1992, Department of Cognitive and Neural Systems, Boston University, USA, seven pages.
Nair, D. et al., "Bayesian Recognition of Targets by Parts in Second Generation Forward Looking Infrared Images," *Image and Vision Computing*, 2000, pp. 849-864, vol. 18.
Namphol, A. et al., "Image Compression with a Hierarchical Neural Network," *IEEE transactions on Aerospace and Electronic Systems*, Jan. 1996, pp. 326-338, vol. 32, No. 1.
Naphade, M. et al., "A Probabilistic Framework for Semantic Video Indexing, Filtering, and Retrieval," *IEEE Transactions on Multimedia*, Mar. 2001, pp. 141-151, vol. 3, No. 1.
Rao, R. et al., "Predictive Coding in the Visual Cortex: A Functional Interpretation of Some Extra-classical Receptive-field Effects," *Nature Neuroscience*, Jan. 1999, pp. 79-87, vol. 2, No. 1.
Spence, C. et al., "Varying Complexity in Tree-Structured Image Distribution Models," *IEEE Transactions on Image Processing*, Feb. 2006, pp. 319-330, vol. 15, No. 2.
Starzyk, J.A. et al., "Spatio-Temporal Memories for Machine Learning: A Long-Term Memory Organization," *IEEE Transactions on Neural Networks*, May 2009, pp. 768-780, vol. 20, No. 5.
Weiss, R. et al., "HyPursuit: A Hierarchical Network Search Engine that Exploits Content-Link Hypertext Clustering," *Proceedings of the Seventh Annual ACM Conference on Hypertext*, Mar. 16-20, 1996, pp. 180-193, Washington, D.C. USA.
Dimitrova, N. et al., "Motion Recovery for Video Content Classification," ACM Transactions on Information Systems, Oct. 1995, pp. 408-439, vol. 13, No. 4.
Dolin, R. et al., "Scalable Collection Summarization and Selection," Association for Computing Machinery, 1999, pp. 49-58.
Guerrier, P., "A Generic Architecture for On-Chip Packet-Switched Interconnections," Association for Computing Machinery, 2000, pp. 250-256.
Kim, J. et al., "Hierarchical Distributed Genetic Algorithms: A Fuzzy Logic Controller Design Application," IEEE Expert, Jun. 1996, pp. 76-84.
Mishkin, M. et al., "Hierarchical Organization of Cognitive Memory," Phil. Trans. R. Soc. B., 1997, pp. 1461-1467, London.
Park, S. et al., "Recognition of Two-person Interactions Using a Hierarchical Bayesian Network," ACM SIGMM International Workshop on Video Surveillance (IWVS) 2003, pp. 65-76, Berkeley, USA.
Poppel, E., "A Hierarchical Model of Temporal Perception," Trends in Cognitive Sciences, May 1997, pp. 56-61, vol. 1, No. 2.
Tsinarakis, G.J. et al. "Modular Petri Net Based Modeling, Analysis and Synthesis of Dedicated Production Systems," Proceedings of the 2003 IEEE International Conference on Robotics and Automation, Sep. 14-19, 2003, pp. 3559-3564, Taipei, Taiwan.
Tsinarakis, G.J. et al. "Modular Petri Net Based Modeling, Analysis, Synthesis and Performance Evaluation of Random Topology Dedicated Production Systems," Journal of Intelligent Manufacturing, 2005, vol. 16, pp. 67-92.
United States Office Action, U.S. Appl. No. 11/680,197, Mar. 23, 2010, twelve pages.
United States Office Action, U.S. Appl. No. 11/713,157, Mar. 31, 2010, 14 pages.
United States Office Action, U.S. Appl. No. 11/622,458, Apr. 1, 2010, 16 pages.
United States Office Action, U.S. Appl. No. 11/622,455, Apr. 21, 2010, 12 pages.
Wu, G. et al., "Multi-camera Spatio-temporal Fusion and Biased Sequence-data Learning for Security Surveillance," Association for Computing Machinery, 2003, pp. 528-538.
European Patent Office Communication, European Patent Application No. 07750385.2, Dec. 6, 2010, eight pages.
European Patent Office Examination Report, European Patent Application No. 08796030.8, Dec. 6, 2010, seven pages.
Lim, K. et al., "Estimation of Occlusion and Dense Motion Fields in a Bidirectional Bayesian Framework," *IEEE Transactions on Pattern Analysis and Machine Intelligence*, May 2002, pp. 712-718, vol. 24, No. 5.
United States Office Action, U.S. Appl. No. 11/680,197, Sep. 14, 2010, seventeen pages.

* cited by examiner

Category = Dog

|    | C0  | C1  | C2  | C3  | C4 |
|----|-----|-----|-----|-----|----|
| C0 | X   | X   | X   | X   | X  |
| C1 | 0.9 | X   | X   | X   | X  |
| C2 | 0.7 | 0.8 | X   | X   | X  |
| C3 | 0.1 | 0.1 | 0.1 | X   | X  |
| C4 | 0.2 | 0.2 | 0.1 | 0.9 | X  |

G1 = C0, C1, C2
G2 = C3, C4

SUPERVISION BASED GROUPING OF PATTERNS IN HIERARCHICAL TEMPORAL MEMORY (HTM)

RELATED APPLICATIONS

This application is related to U.S. patent application Ser. No. 11/351,437 entitled "Architecture of a Hierarchical Temporal Memory Based System," filed on Feb. 10, 2006; U.S. patent application Ser. No. 11/622,458 entitled "Belief Propagation in a Hierarchical Temporal Memory Based System," filed on Jan. 11, 2007; U.S. patent application Ser. No. 11/622,457 entitled "Pooling in a Hierarchical Temporal Memory Based System" filed on Jan. 11, 2007; U.S. patent application Ser. No. 11/622,454 entitled "Sequence Learning in a Hierarchical Temporal Memory Based System," filed on Jan. 11, 2007; U.S. patent application Ser. No. 11/622,456 filed on Jan. 11, 2007; U.S. patent application Ser. No. 11/622,455 entitled "Message Passing in a Hierarchical Temporal Memory Based System," filed on Jan. 11, 2007; U.S. patent application Ser. No. 11/945,911 entitled "Group-Based Temporal Pooling," filed on Nov. 27, 2007; U.S. patent application No. 60/947,272 entitled "Time Based Inference," filed on Jun. 29, 2007; and U.S. patent application Ser. No. 12/053,204 entitled "Feedback in Group Based Hierarchical Temporal Memory System" filed on Mar. 21, 2008, which are incorporated by reference herein in their entirety.

FIELD OF INVENTION

The present invention relates to a Hierarchical Temporal Memory (HTM) system with a node for assigning a pattern in input data into groups in a training mode based on a supervision signal indicating a correct category of the pattern.

BACKGROUND OF THE INVENTION

Hierarchical Temporal Memory (HTM) network systems represent a new approach to machine intelligence. In HTM network systems, training data comprising temporal sequences of spatial patterns are presented to a network of nodes. The HTM systems then build a model of the statistical structure inherent to the patterns and sequences in the training data, and thereby learns the underlying 'causes' of the temporal sequences and spatial patterns in the training data. The hierarchical structure of the HTM systems allows building of models that have very high dimensional input spaces using reasonable amounts of memory and processing capacity.

The HTM network is a group of processing nodes structured hierarchically. The nodes are hierarchically connected such that each node other than the bottommost node and the topmost node has several children nodes (i.e., nodes at a lower level) and one parent node (i.e., node at a higher level). Each level of nodes has a capacity to store and process information at different levels of abstraction. Bottom nodes are often coupled to receive sensory input pattern which has the lowest level of abstraction. The topmost node, on the other hand, produces an index indicating the cause of the sensory input pattern, and therefore, produces information at the highest level of abstraction. Each node between the bottom nodes and the top node is arranged to (i) propagate information "forward" (i.e., "up" an HTM hierarchy) to any connected parent node and/or (ii) propagate information "back" (i.e., "down an HTM hierarchy) to any connected children nodes.

The HTM training process is a form of unsupervised machine learning. However, during the training process, indexes representing the input patterns may be presented to the top node of the HTM network as well. These indexes allow the top node of the HTM network to associate particular categories with the underlying generative causes that are learned by the HTM network. Once an HTM network has built a model of a particular input space, it can be switched into an 'inference' mode. In this mode, novel input patterns are presented to the HTM network, and the HTM network will generate distributions that provide a quantitative measure of the degree of belief or likelihood that the input pattern was generated by the underlying cause associated with each of the categories to which the HTM network was exposed during the training stage.

For example, an HTM network might have been exposed to images of different animals, and simultaneously provided with category indexes such as 'dog', 'cat', and 'bird' that identifies objects in the images in the training mode. In the inference stage, the HTM network may be presented with a novel image of an animal, and the HTM network may generate distributions indicating the likelihood that the presented image was 'dog', 'cat' or 'bird'. The distributions may include elements representing the relative belief or likelihood that the novel input pattern is an image of a 'dog', 'cat', 'bird', etc.

SUMMARY OF THE INVENTION

Embodiments provide a supervised learning node that learns patterns based on a supervision signal indicating the correct category of training input data. In a learning mode, the supervised learning node assigns patterns in training data to groups depending upon whether the supervision signal indicated one or more categories for the patterns throughout the received training input data. In an inference mode, the supervised learning node generates distribution over groups created in the training mode in response to receiving sample input data. The distribution indicates the likelihood that a pattern in the sample input data belongs to a group created in the training mode. The distribution is propagated upward to the top node of the HTM network where an output indicating the correct category of the sample input data is generated.

In one embodiment, the supervised learning node has a larger receptive field in the training mode compared to the inference mode. The larger receptive fields allow the supervised learning node to take into account the context of a pattern when assigning the pattern to a group.

In one embodiment, the supervised learning node generates a correlation table where each entry indicates the correlation of two patterns in the training input data. The higher degree of correlation indicates that the two patterns are likely to be representative of the same or similar context in the training input data. Patterns surrounding the two patterns are compared and scored to evaluate the correlation of the two patterns. The two patterns are assigned to groups based on the degree of correlation between the two patterns.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF THE FIGURES

The teachings of the present invention can be readily understood by considering the following detailed description in conjunction with the accompanying drawings.

DETAILED DESCRIPTION OF THE INVENTION

Figure 1:
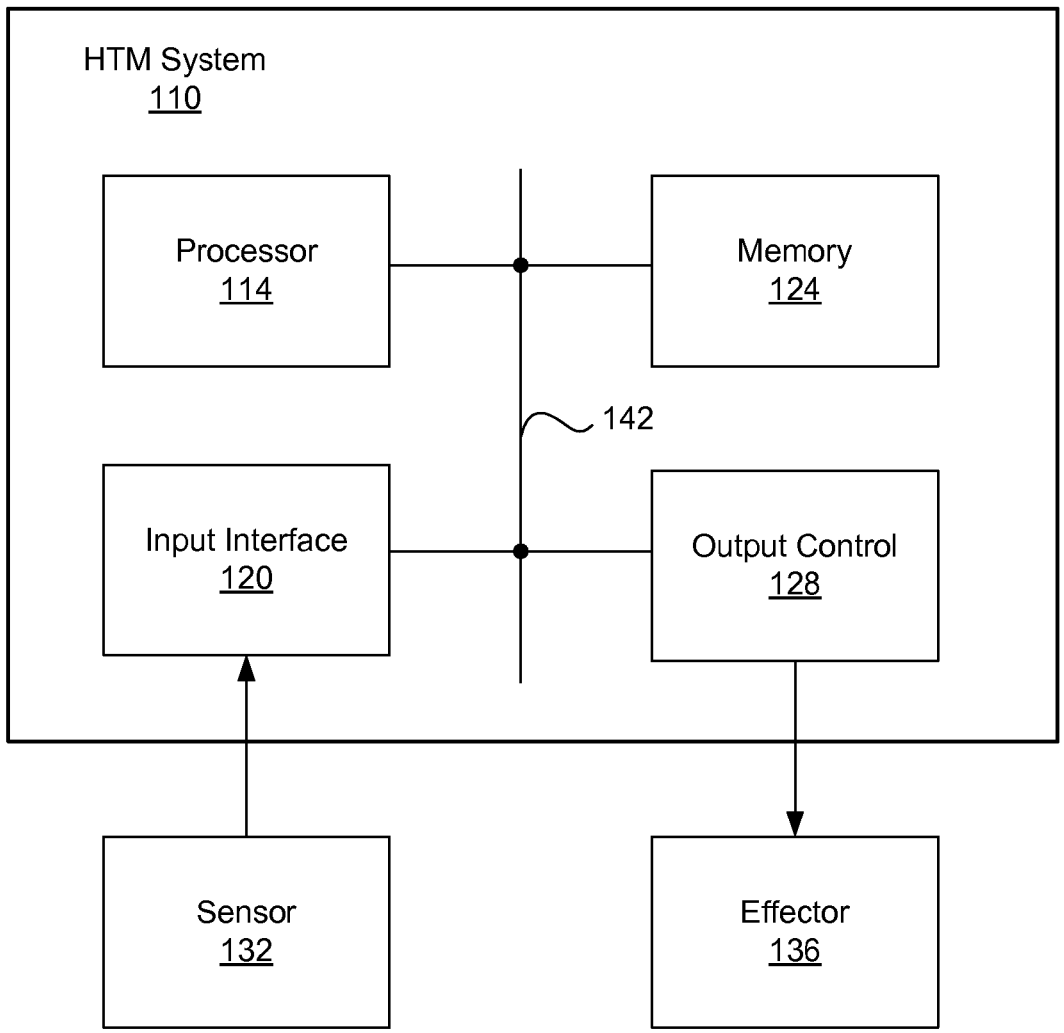
FIG. 1 is a schematic diagram illustrating a hierarchical temporal memory (HTM) network system, according to one embodiment of the present invention.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

Architecture of the System

FIG. 1 is a schematic diagram illustrating a hierarchical temporal memory (HTM) system 110, according to one embodiment. The HTM system 110 includes, among other components, a processor 114, an input interface 120, a memory 124 and an output control 128. These components are connected via a bus 142. Although the HTM system 110 is illustrated as being embodied on a single device, the HTM system 110 may be scattered across a cluster of devices where each device embodies a portion of the HTM network.

The processor 114 processes data signals and may comprise various computing architectures such as a complex instruction set computer (CISC) architecture, a reduced instruction set computer (RISC) architecture, or an architecture implementing a combination of instruction sets. Although only a single processor is shown in FIG. 1, multiple processors may be included in the HTM system 110. Each of the multiple processor may form a node processing unit that manages a portion of the HTM network, as described, for example, in U.S. patent application Ser. No. 11/351,437 entitled "Architecture of a Hierarchical Temporal Memory Based System" filed on Feb. 10, 2006, which is incorporated by reference herein in its entirety.

The memory 124 stores various software components for embodying, managing and executing the HTM network on the HTM system 110. The memory 124 also stores various variables (e.g., distributions and co-occurrences) associated with the HTM network for training or to perform inference.

The input interface 120 is coupled to a sensor 132 for receiving sensory input patterns representing various real world values, objects, sounds, frequencies, valuations, and patterns, for example. The input interface 120 may also implement various filters or digital processing capabilities to process the sensory input pattern into a format suitable for processing by the HTM network. The sensor 132 coupled to the input interface 120 translates various physical characteristics detectable by human or non-human senses into digital data. The sensor 132 may include, among others, visual sensors, acoustic sensors, temperature sensors, vibration sensors, network traffic detectors, tactile sensors, chemical sensors, mechanical sensors, and data sensors, electromagnetic sensors and other sensors capable of receiving real world objects and data input representations. Although FIG. 1 illustrates a single sensor being coupled to the HTM network, a plurality of sensors may be used. When a plurality of sensors are used, the sensors need not be of the same type. Further, different types of sensors (e.g., visual sensors and acoustic sensors) may be used in combination. The sensors need not be located in proximity. For example, the sensor may be deployed in various parts of a facility to receive measurements or dispersed at various locations on earth to collect weather information.

Alternatively, the HTM system 110 is not coupled to a sensor but instead coupled to a data source providing various real-world or simulated data. The HTM system 110 receives input pattern from various sources including, among others, databases, computing devices and communication devices. The input pattern may represent various types of information including stock market fluctuation, simulated movements of humans or animals, mathematical equations, and network traffic conditions, for example.

The output control 128 interfaces with an effector 136 to generate a real-world event. The effector 136 may be any device that translates output signals from the output control 128 to physical properties. The effector 136 includes, among others, display devices, speakers, motors and actuators. Although FIG. 1 illustrates one effector, a plurality of effectors may be coupled to the HTM system 110. In one embodiment, the effector 136 is embodied as a data processor for processing various types of data. For example, the effector 136 is an email filter that identifies unsolicited bulk email (i.e., 'spam'), an image processor that determines whether certain digital pictures are pornographic or non-pornographic, a loan application processor that classifies loan applicants as good or bad credit risks, and a network manager that determines whether certain network traffic is malicious or benign.

Figure 2:
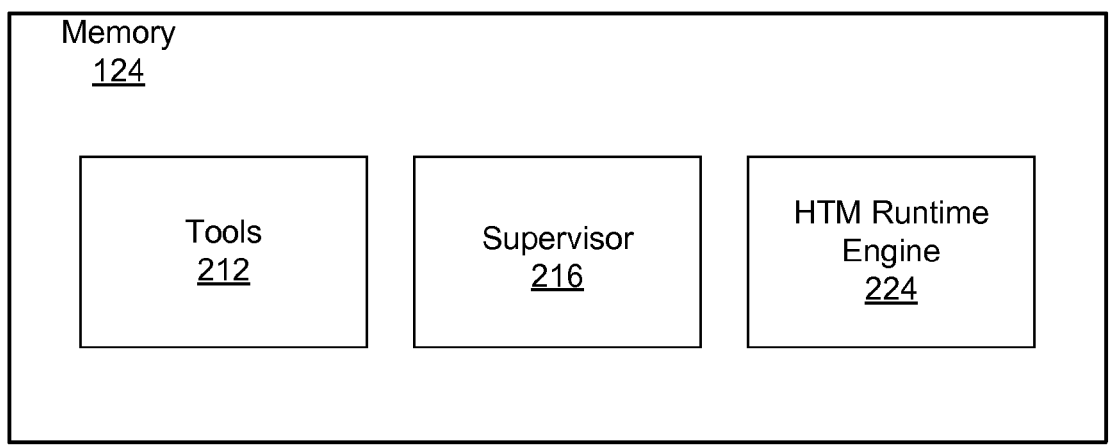
FIG. 2 is a block diagram illustrating a memory of the HTM system, according to one embodiment of the present invention.

FIG. 2 is a block diagram illustrating software components stored in the memory 124, according to one embodiment. The memory 124 includes, among others, tools 212, a supervisor 216 and a HTM runtime engine 224, as described, for example, in U.S. patent application Ser. No. 11/351,437 entitled "Architecture of a Hierarchical Temporal Memory Based System" filed on Feb. 10, 2006, which is incorporated by reference herein in its entirety. The tools 212 allow a user to configure, design, train, debug, modify and deploy the HTM network in the HTM system 110. The supervisor 216 is responsible for, among other things, starting and stopping the HTM network and communicating with the tools. The HTM runtime engine 224 is composed of software executables for constructing the HTM network and running the HTM network on the HTM system 110.

Figure 3:
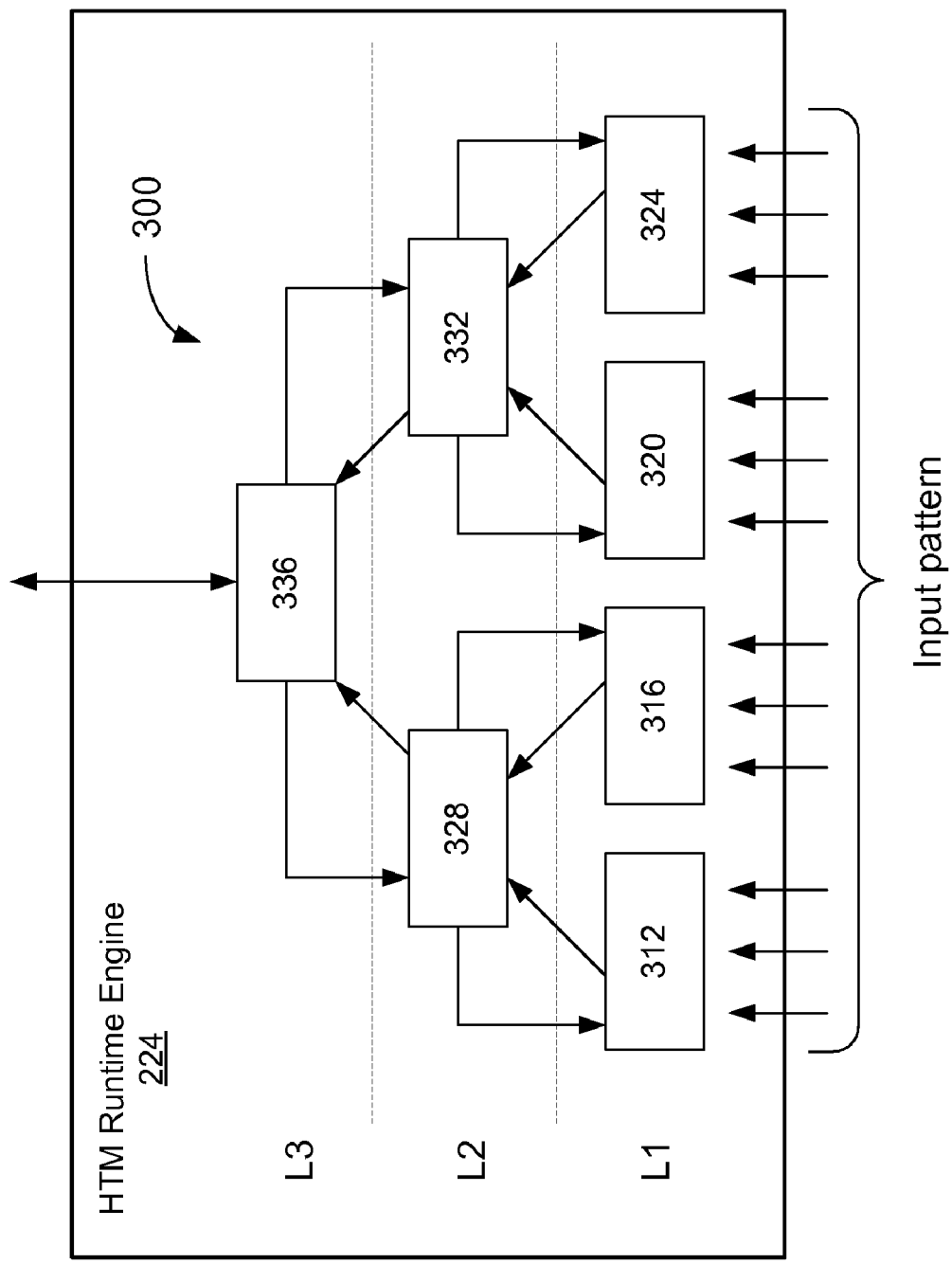
FIG. 3 is a conceptual hierarchy diagram of a HTM network, according to one embodiment of the present invention.

FIG. 3 is a conceptual diagram of a HTM network, according to one embodiment. The HTM network 300 illustrated in FIG. 3 consists of three levels L1, L2, L3, with level L1 being the lowest level, level L3 being the highest level, and level L2 being between levels L1 and L3. Level L1 has nodes 312, 316, 320, 324; level L2 has nodes 328, 332; and level L3 has node 336. The nodes 312, 316, 320, 324, 328, 332, 336 are hierarchically connected in a tree-like structure such that each node may have several children nodes (i.e., nodes connected at a lower level) and one parent node (i.e., node connected at a higher level). Each node 312, 316, 320, 324, 328, 332, 336 may have or be associated with a capacity to store and process information of different receptive fields of input pattern. Each node 312, 316, 320, 324, 328, 332, 336 learns patterns or sequences in the input data in a training mode, and outputs vectors or distributions for the input pattern in an inference mode following the training mode. Further, each node 312, 316, 320, 324, 328, 332, 336 may be arranged to (i) propagate information "forward" (i.e., "up" an HTM network) to any connected parent node and/or (ii) propagate information "back" (i.e., "down an HTM network) to any connected children nodes.

In one or more embodiments, the training of the HTM network 300 is performed progressively for each level L1, L2 and L3. The nodes 312, 316, 320, 324 in level L1 receive the input pattern and learn patterns and sequences in the input pattern. After training, the nodes 312, 316, 320, 324 in level L1 are ready to generate vectors or distributions in an inference mode. The nodes 312, 316, 320, 324 in level L1 are then switched to the inference mode while the nodes 328, 332 in level L2 are placed in the training mode. The same input pattern is provided to the nodes 312, 316, 320, 324 in level L1. The nodes 312, 316, 320, 324 in level L1 produce vectors or distributions in response to the input pattern. The vectors or distributions from the nodes in level L1 become the input pattern for the nodes 328, 332 in level L2. The nodes 328, 332 in level L2 learns the patterns and sequences in the vectors or distributions produced by the nodes 312, 316, 320, 324 in level L1.

After the nodes 328, 332 learn the patterns and sequences, the nodes 328, 332 are prepared to generate their indexes or distributions. The nodes 328, 332 in level L2 are then switched to the inference mode while all the nodes in levels L1 and L2 are remain in the inference mode. The same input pattern is fed to the nodes at level L1, and the vectors or distributions propagated upward by nodes in levels L1 and L2 to the node 336 at the highest level L3. The node 336 is provided with an index or label of a category indicating what the input patterns received at the HTM network 300 represent (e.g., a dog or a cat). The node 336 then maps the index or distribution received from nodes in level L2 to the indicated category. All the nodes are now trained. The node 336 may then be switched to the inference mode where an output indicating the correct category of causes or distributions of likely causes is generated by the node 336.

The sensed input pattern of each of level L1 nodes 312, 316, 320, 324 is arranged to receive a subset of an entire input space. The subset of the entire input space that is covered by each node is referred to herein as a receptive field. For example, if an image of 8×8 pixels represents an entire input space, each level L1 node 312, 316, 320, 324 may receive a sensed input pattern from a particular block of 2×2 pixels or 4×4 pixels. Each level L2 node 328, 332, being a parent of more than one level L1 node 312, 316, 320, 324, covers more of the entire input space than does each individual level L1 node 312, 316, 320, 324. It follows that in FIG. 3, the level L3 node 336 covers the entire input space by receiving, in the form of vectors or distributions from the nodes of level L2, the sensed input pattern received by all of the level L1 nodes 312, 316, 320, 324. Moreover, in one or more embodiments, the ranges of sensed input pattern received by two or more nodes 312, 316, 320, 324, 328, 332 may overlap, as described below in detail with reference to FIG. 9.

One or more types of nodes may be employed in the same HTM network 300. The nodes that can be deployed in the HTM network 300 include, among others, the spatio-temporal learning (STL) nodes, as described in U.S. patent application Ser. No. 12/039,630 entitled "Spatio-Temporal Learning Algorithms In Hierarchical Temporal Networks," filed on Feb. 28, 2008, which is incorporated by reference herein in its entirety. The HTM network 300 may also employ supervised learning nodes and hybrid nodes, as described below in detail with reference to FIGS. 5 and 8.

While the HTM network 300 illustrated in FIG. 3 is described as having three levels, an HTM network in accordance with one or more embodiments may have any number of levels. Moreover, the hierarchical structure of an HTM network may be different than that shown in FIG. 3. For example, an HTM network may be structured such that one or more parent nodes have three children nodes as opposed to two children nodes as illustrated in FIG. 3. Further, in one or more embodiments, an HTM network may be structured such that a parent node in one level of the HTM network has a different number of children nodes than a parent node in the same or another level of the HTM network. Further, in one or more embodiments, an HTM network may be structured such that a parent node receives input patterns from children nodes in multiple levels of the HTM network. There are various and numerous ways to structure an HTM network other than as shown in FIG. 3.

Intermediate Level Supervised Learning

Spatial patterns or temporal sequences in input data may grouped in a training mode based on temporal proximity of patterns, for example, as in the spatio-temporal learning (STL) nodes (also referred to as "Zeta-1 node") of U.S. patent application Ser. No. 12/039,630. The STL nodes in an inference mode generated distributions over the groups created in the training mode.

Figure 4:
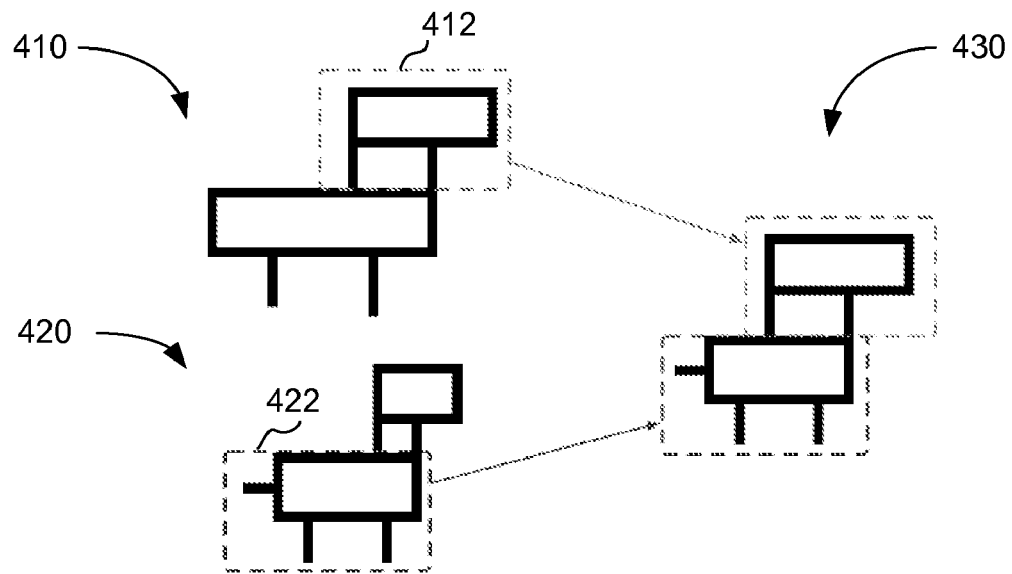
FIG. 4 is a diagram illustrating images for recognition by a HTM network of the present invention.

Grouping of co-occurrences based solely on the temporal proximity of co-occurrences, however, may not be adequate or sufficient in certain circumstances. FIG. 4 is a diagram illustrating three images of dogs 410, 420, 430 for recognition by the HTM network. The first and second images 410, 420 represent images already learned by the HTM network. The third image 430 consists of a head portion 412 from the first image 410 and a body part 422 from the second image 420. If the co-occurrences are grouped based only on the temporal proximity of the spatial patterns, co-occurrences not temporally correlated are unlikely to be grouped together even if the co-occurrences represent the same category. The STL node groups co-occurrences based only on temporal proximity of co-occurrences. Therefore, unless the patterns of the first and second images 410, 420 were presented to the STL node close in time, the STL node does not categorize the patterns associated with the images 410, 420 into the same group even though these two image 410, 420 relate to the same category (i.e., dog). When presented with the third image 430, the STL node (and consequently, the HTM network) may incorrectly identify the object in the image 430 based on the temporal proximity of co-occurrences.

Embodiments provide a method or a node (hereinafter referred to as the "supervised learning node") for a HTM network that uses supervision signals such as indexes for correct categories of the input patterns to group the co-occurrences detected in the node. In the training mode, the supervised learning node receives the supervision signals in addition to vectors or distributions from children nodes. The supervision signal is then used to group the co-occurrences. Contrast this with the Spatio-Temporal Learning (STL) network of U.S. patent application Ser. No. 12/039,630 where only the top node of the HTM network receives the supervision signal during in the training mode.

Figure 5:
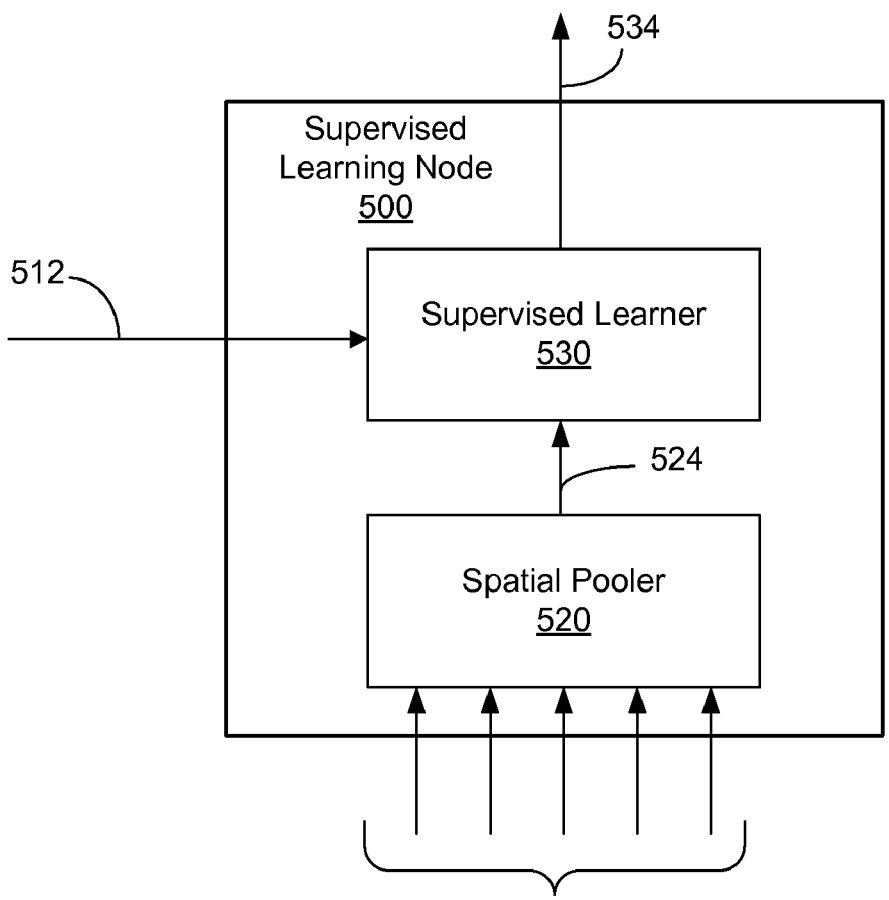
FIG. 5 is a block diagram illustrating a supervised learning node, according to one embodiment of the present invention.

FIG. 5 is a block diagram illustrating a supervised learning node 500, according to one embodiment. The supervised learning node 500 includes, among other components, a supervised learner 530 and a spatial pooler 520. The spatial pooler 520 receives input pattern 516 (which are vectors or distributions generated by children nodes) and detects co-occurrences in the input pattern 516. In the training mode, the spatial pooler 520 detects co-occurrences in the training input pattern. In one embodiment, the spatial pooler 520 provides a distribution 524 to the supervised learner 530 when training the supervised learner 530. In one embodiment, the distribution 524 from the spatial pooler 520 in the training mode includes a non-zero value for a winning co-occurrence (i.e., the most likely co-occurrence) and zero values for all the other co-occurrences. In the inference mode, the spatial pooler 520 receives sample input patterns for inference and outputs distributions over the co-occurrences encountered by the spatial pooler 520 in the training mode.

In one embodiment, the supervised learner 530, in the training mode, groups the co-occurrences detected by the spatial pooler 520 into one or more groups. Then, in the inference mode, the supervised learner 530 produces a distribution over the groups created in the training mode in response to receiving the output 524. The process of grouping the co-occurrences into groups is described below in detail with reference to FIGS. 6A through 7. The supervision signal 512 including the correct index may be propagated down from the top node 336 as a feedback signal or be received from external sources such as user interfaces.

It is not essential that the supervised learning node include a spatial pooler. The supervised learning node may include only the supervised learner 530. Alternatively, the supervised learning node may include other components for processing the input pattern 516 from the children nodes, as described, for example, below in detail with reference to FIG. 8.

Figures 6A, 6B:
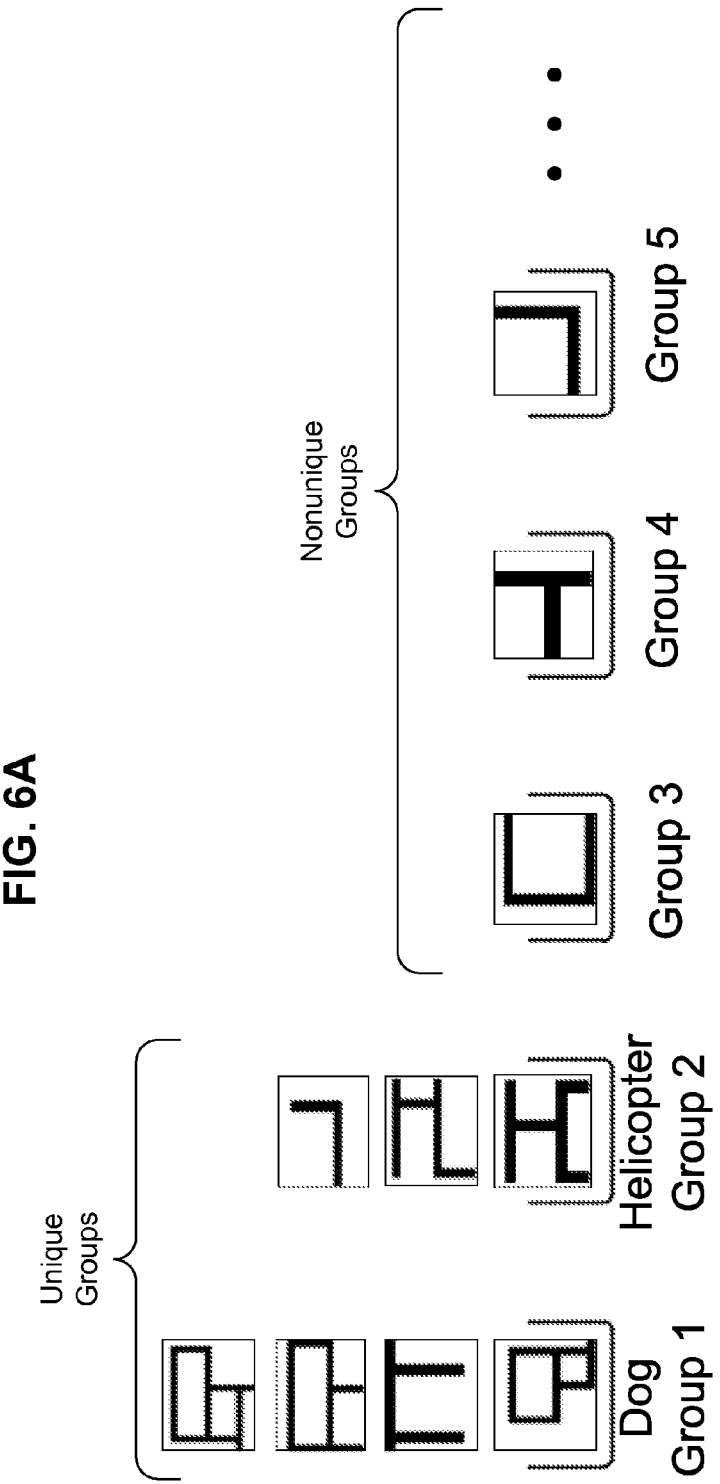
FIG. 6A is a table illustrating counts of spatial co-occurrences at a supervised learning node, according to one embodiment of the present invention.
FIG. 6B is a diagram illustrating grouping of spatial co-occurrences into groups based on supervision signals, according to one embodiment of the present invention.

FIG. 6A is a table illustrating the counts of categories for spatial co-occurrences, according to one embodiment. In the training mode, the supervised learning node 500 receives multiple winning co-occurrences from the spatial pooler 520. The training input pattern includes N numbers of distinct co-occurrences. For each co-occurrence received at the supervised learning node 500, an index indicating the correct category of the co-occurrence is received as a supervision signal. The counts of co-occurrences and the indexes of the categories are tallied to generate the table as illustrated in FIG. 6A. The column in the table of FIG. 6A represent co-occurrences (C1 through CN) and the row of the table indicates the indexes of categories received for the co-occurrences in the training mode. In FIG. 6A, the supervised learning node 500 received four counts of co-occurrence C1 during which an index for "dog" is included in the supervision signal 512. Similarly, the supervised learning node 500 received co-occurrence C3 six times, three of which were indicated as being for the index of "dog" and the remaining three counts were indicated as being for the index of "cat."

After all the training data is received, the table as illustrated in FIG. 6A is generated. A co-occurrence that appears only while the supervision signal 512 indicates one particular category is assigned to the unique group for that category. Each co-occurrence that appears for two or more categories is assigned to its own nonunique group. The nonunique groups are groups with one or more co-occurrence in input patterns indicated as corresponding to more than one category. FIG. 6B is a diagram illustrating grouping of spatial co-occurrences into groups based on indexes indicating the categories, according to one embodiment. In the example of FIG. 6B, four co-occurrences are assigned to group 1 representing "dog," three co-occurrences are assigned to group 2 representing "helicopter," while the remaining co-occurrences are assigned to nonunique groups (groups 3, 4, 5, etc).

By grouping the co-occurrences based on the supervision signal, the supervised learning node 500 may recognize causes not apparent from temporal relationship of the co-occurrences. That is, the supervised learning node may detect a cause or relationship between co-occurrences that the STL node may not detect. Therefore, the supervised learning node may infer the object or the state of the object more accurately when used alone or in conjunction with the STL node.

In the inference mode, the supervised learning node 500 receives input patterns for inference from its children nodes and generates distributions over the groups created in the learning stage. After the groups are created, the process of generating distributions from the supervised learning node is similar to the STL node, as described in U.S. patent application Ser. No. 12/039,630.

The supervised learning node 500 is more effective if more co-occurrences are assigned to unique groups. In one embodiment, the grouping of co-occurrences is biased so that more co-occurrences are assigned to unique groups. For example, when the index of a category is received for a co-occurrence over a threshold percentage of instances, the same co-occurrence is assigned to the category indicated by the index even though the index for another category was received one or more times. In this way, the inference capability of the supervised learning node 500 may be maintained even when input patterns are noisy.

Figure 7:
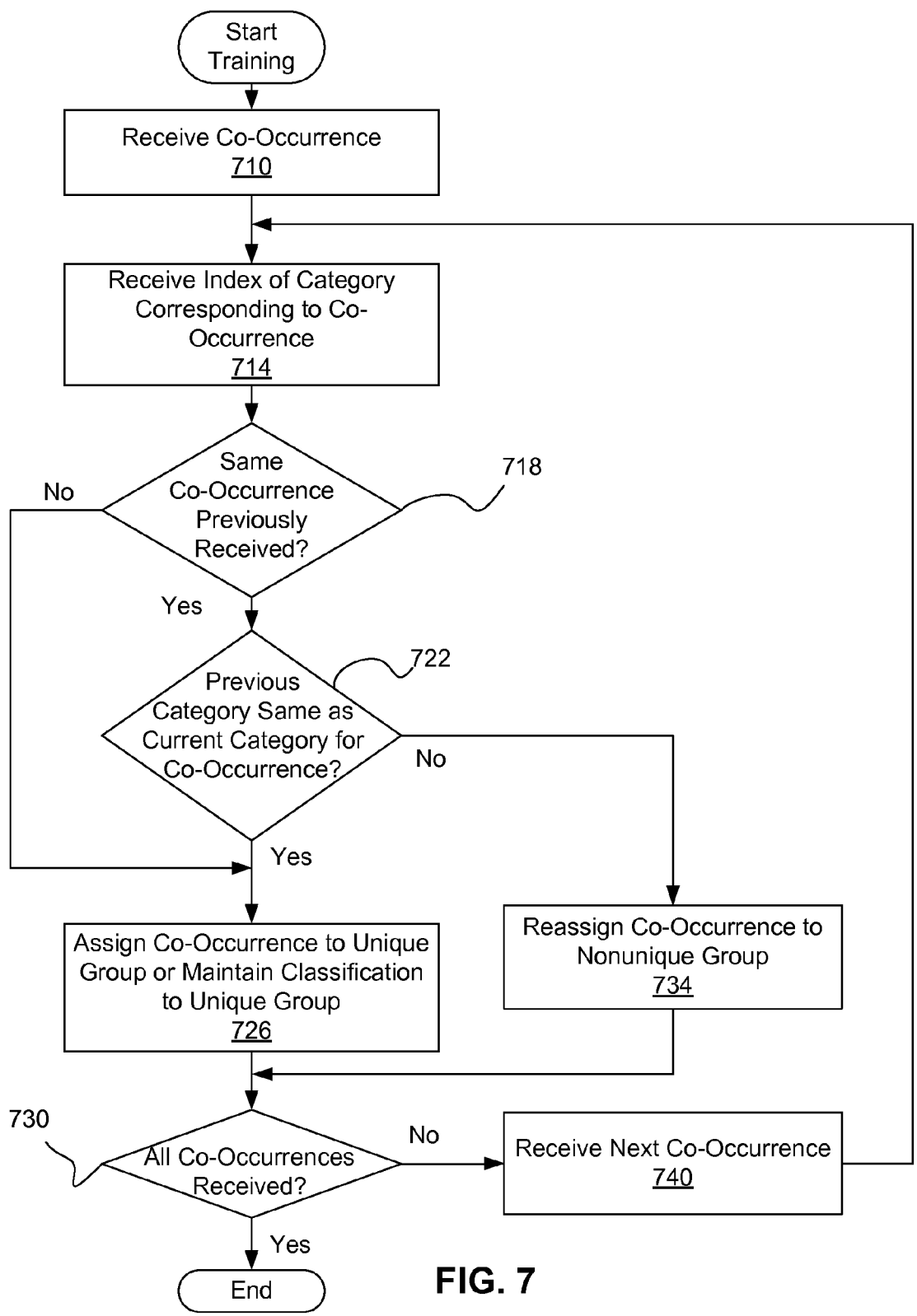
FIG. 7 is a flow chart illustrating the process of training a supervised learning node, according to one embodiment of the present invention.

FIG. 7 is a flow chart illustrating the process of training a supervised learner 530, according to one embodiment. In this embodiment, the supervised learner 530 groups a co-occurrence to a unique group representing the category indicated by the supervision signal and later reassigns the same co-occurrence to a nonunique group if a different category is indicated for the same co-occurrence in a subsequent input pattern. Specifically, the supervised learner 530 first receives 710 distributions from the spatial pooler 520. The supervised learner 530 also receives 714 an index of the category corresponding to the co-occurrence as a supervising signal. Then it is determined whether the same co-occurrence was previously received 718 at the supervised learner 530. If the same co-occurrence was not previously received, the co-occurrence is temporarily assigned 726 to a unique group representing the category indicated in the supervising signal.

If the same co-occurrence was previously received, it is determined 722 whether the index of category was the same in the previous instance(s). If the indexes of category were the same, then the co-occurrences remain assigned 726 to the group representing the category indicated by the supervising signal. It is then determined 730 if all the co-occurrences were received. If there are other co-occurrences to be received, then the next co-occurrence is received 740 and the supervised learner 530 proceeds to receive 714 an index of category for the next co-occurrence.

On the other hand, if the indexes of category are different for the same co-occurrence, then the co-occurrence is reassigned 734 to a nonunique group. Each nonunique group includes one co-occurrence that appear in more than one category. Then it is determined 730 whether all the co-occurrences are received. If it is determined 730 that all the co-occurrences are received, the process terminates.

Figure 8:
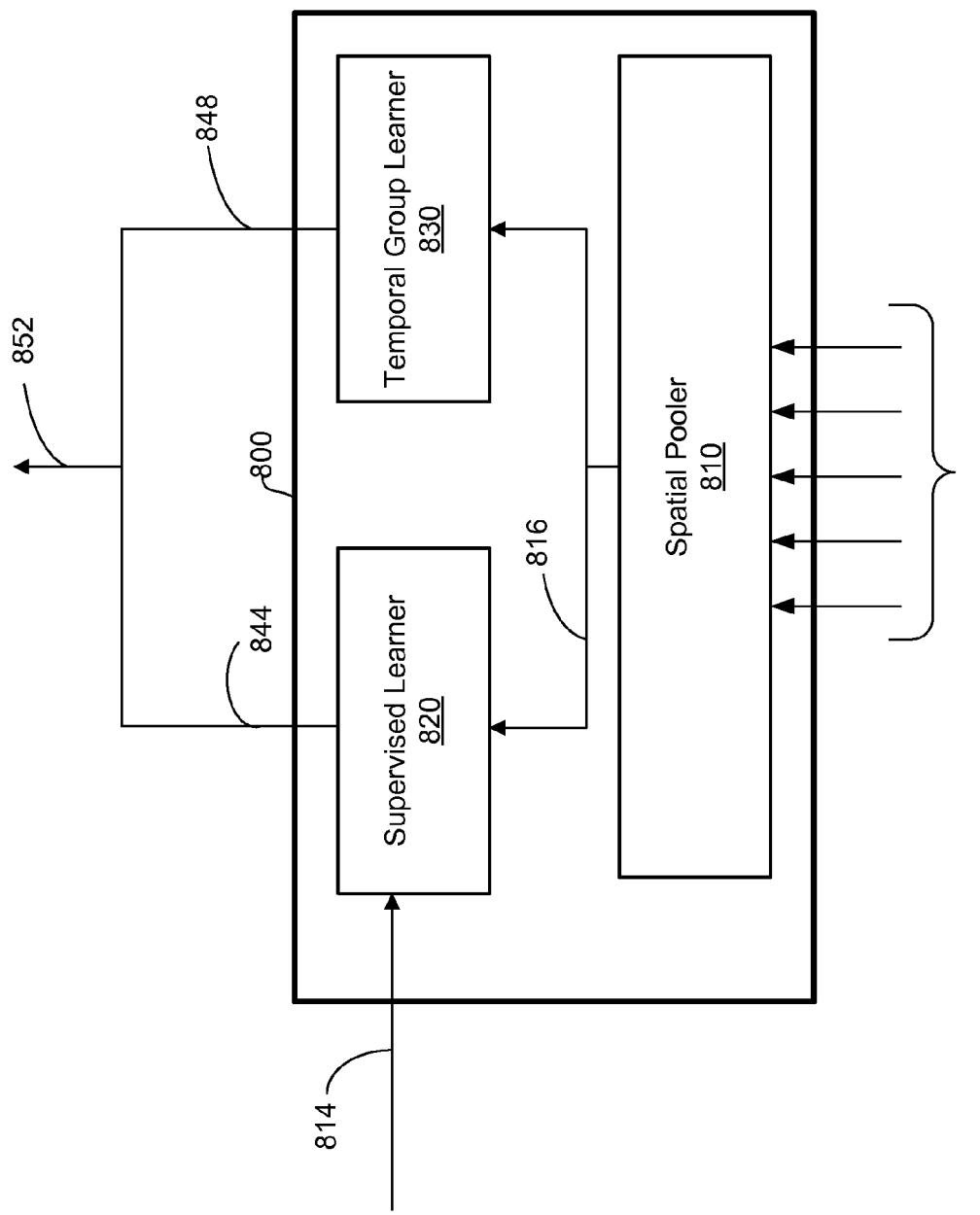
FIG. 8 is a block diagram illustrating a hybrid node including a supervised learner and a temporal group learner, according to one embodiment of the present invention.

FIG. 8 is a block diagram illustrating a hybrid node 800 including a supervised group learner 820 and a temporal group learner 830, according to one embodiment. In the training mode, both learners 820, 830 receive the same distribution 816 from a spatial pooler 810. The supervised learner 820 receives the supervision signal 814 including the index of the correct category of the input patterns. The supervised learner 820 then assigns the co-occurrences into groups, as described above in detail with reference to FIG. 5. The temporal group learner 830 also assigns the co-occurrences into groups independent of the supervised learner 820, as described, for example, in U.S. patent application Ser. No. 12/039,630.

In the inference mode, the supervised learner 820 generates distributions 844 over the co-occurrences detected by the spatial pooler 810. Likewise, the temporal group learner 830 generates distributions 848 over the co-occurrences detected by the spatial pooler 810. In one embodiment, the distributions 844 and the distributions 848 are concatenated and provided as a single output 852 to one or more parent nodes of the hybrid node 800. The parent node(s) receives the concatenated distributions 852 from the hybrid node 800 as part of the input patterns for processing.

Context Aware Supervised Learning

The supervision-based grouping of the co-occurrences may be enhanced by expanding the receptive field in the learning mode to learn context of the input patterns. Specifically, the receptive field for the supervised learning node is expanded in the training mode to cover a larger input space compared to the receptive field in the inference mode. In one embodiment, the expanded receptive field includes a center receptive field that is used in the inference mode. The supervised learning node 500 takes into account the similarity of input patterns surrounding co-occurrences to assign the co-occurrences into groups. In this way, the supervised learning node 500 may avoid over-inclusive grouping of the co-occurrences in the learning mode.

Figure 9:
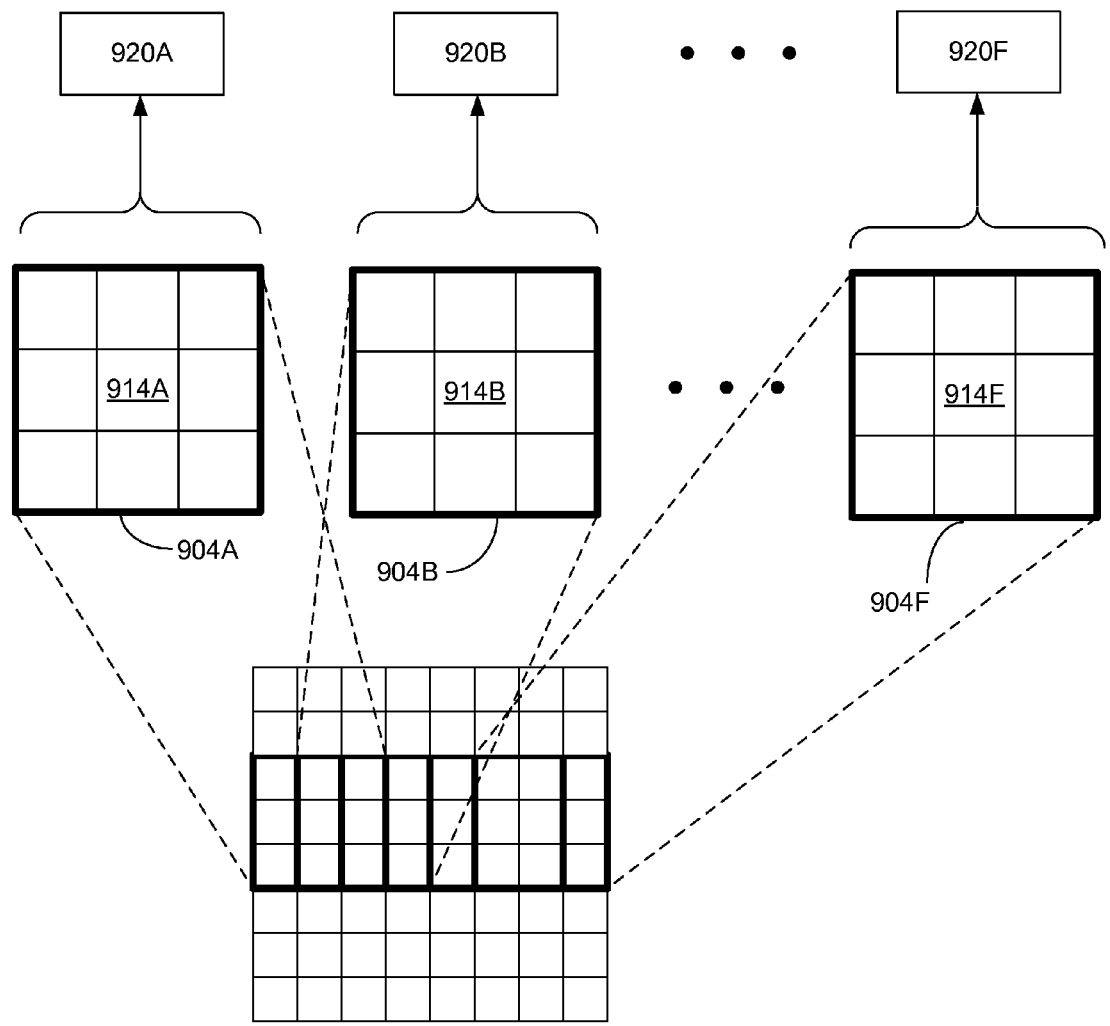
FIG. 9 is a diagram illustrating expanded receptive fields for context aware learning in a supervised learning node, according to one embodiment of the present invention.

FIG. 9 is a diagram illustrating expanded receptive fields 904A through 904F for context aware training of the supervised learning nodes 920A through 920F. In the training mode, the supervised learning nodes 920A through 920F in a level of the HTM network receive input patterns for expanded receptive fields 904A through 904F from their children nodes. In the inference mode, however, the supervised learning nodes 920A through 920F receive input patterns for smaller receptive fields 914A through 914F. In the example of FIG. 9, each expanded receptive field 904A through 904F for the training mode consists of nine smaller receptive fields for the inference mode. The expanded receptive fields 904A through 904F include center receptive fields 914A through 914F, respectively. Further, each expanded receptive field overlaps with the adjacent expanded receptive field that two adjacent expanded receptive field share six smaller receptive fields. By using the overlapping expanded receptive fields, better inference may be achieved because the boundary effects are reduced or eliminated.

Figure 10A:
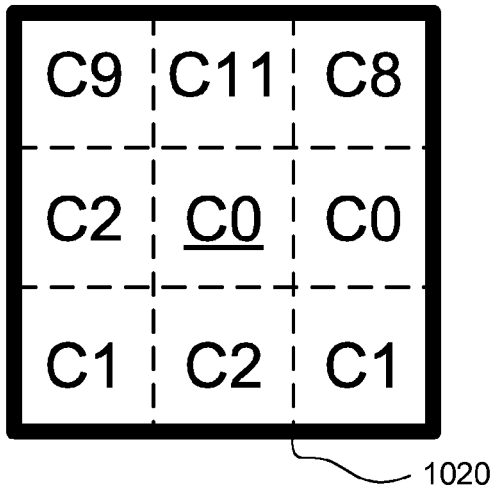
FIGS. 10A and 10B are diagrams illustrating two sets of co-occurrences in expanded receptive fields where the same category is indicated for the two sets of the co-occurrences, according to one embodiment of the present invention.
Figure 10B:
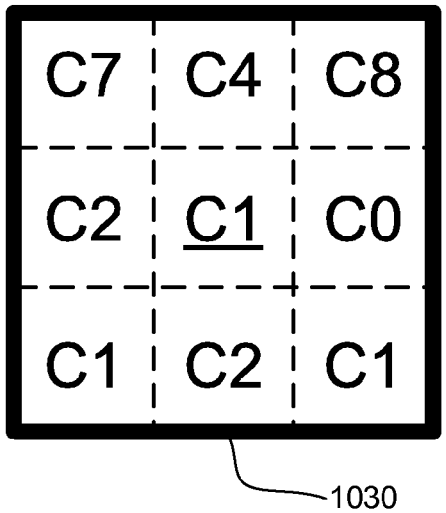

FIGS. 10A and 10B are diagrams illustrating co-occurrences detected in expanded receptive fields 1020, 1030 where supervising signals indicate the same category ("dog"), according to one embodiment. The expanded receptive field 1020 has a center co-occurrence C0 that is surrounded by neighboring co-occurrences C9, C11, C8, C0, C1, C2, C1 and C2 (listed clockwise starting from the top left corner). The expanded receptive field 1030 has a center co-occurrence C1 surrounded by neighboring co-occurrences C7, C4, C8, C0, C1, C2, C1 and C2 (listed clockwise starting from the top left corner).

In one embodiment, the supervised learning node generates or updates profiles of neighboring co-occurrences of a center co-occurrence after receiving input patterns for each expanded receptive fields. The profile of the neighboring co-occurrences indicates the context in which the center co-occurrence often appears. Specifically, the profile for a center co-occurrence indicates which arrangements of neighboring co-occurrences often surround the profiled co-occurrences. For example, the profile of co-occurrence C0 may indicate that neighboring co-occurrence C8 is found in the right top corner 80% of the input patterns. The profiles are generated for all co-occurrences assigned to unique groups (i.e., the co-occurrences appear only for one category). In one embodiment, sets of co-occurrences for each expanded receptive fields are stored in the supervised learning mode and then processed in a batch. In another embodiment, the profile of a co-occurrence is gradually updated as new sets of co-occurrences are received. After the profiles are generated, the profiles of the two center co-occurrences are compared pairwise to score the degree of matching between the profiles. Based on the pairwise comparison, a correlation table is created, as described below in detail with respect to FIG. 12. If the profiles of two co-occurrences match closely, then the two co-occurrences are likely to be assigned into the same group because the two co-occurrences appear in the same context.

Alternatively, the supervised learning node may count the number of matching co-occurrences surrounding the center co-occurrences. All sets of co-occurrences for the expanded receptive fields received in the training mode are stored in the supervised learning mode. Then, the set of neighboring co-occurrences surrounding a center co-occurrence (e.g., co-occurrence C0) is compared with the set of neighboring co-occurrences surrounding another center co-occurrence (e.g., co-occurrence C1) to check for the number of surrounding co-occurrences appearing in the same neighboring locations relative to the center co-occurrences. Referring to FIGS. 10A and 10B, for example, the two expanded receptive fields 1020, 1030 share six co-occurrences (C8, C0, C1, C2, C1 and C2) at the same neighboring locations of the center co-occurrences (C0 and C1). The matching for two center co-occurrences (C0 and C1) is scored as ⅝ (six matches out of eight surrounding co-occurrences).

During the training, the supervised learning node may receive more than one sets of input pattern where the center co-occurrences are the same. In such case, each set of input patterns including the same center co-occurrence is compared pairwise individually with other sets of input patterns with different co-occurrence. For example, if five input patterns having center co-occurrence C0 are received and three input patterns having center co-occurrence C1 are received, a total of fifteen (5×3) separate comparisons are performed to score the matching between the co-occurrences C0 and C1. The results of the comparison for different input patterns with the same center co-occurrence are updated and stored in the same entry of the correlation table, as described below in detail with reference to FIG. 12.

Figure 11A:
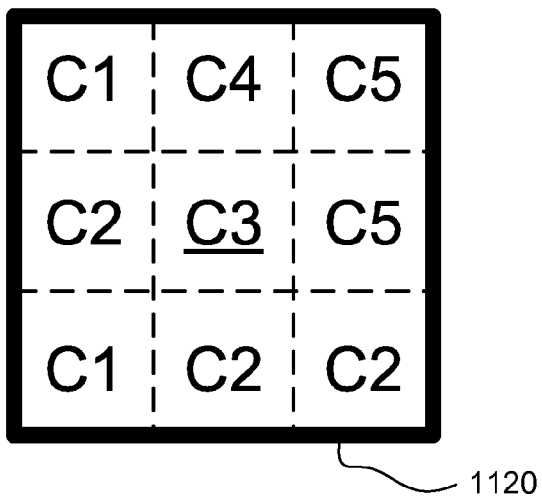
FIGS. 11A and 11B are diagrams illustrating two sets of co-occurrences in expanded receptive fields where different categories are indicated for the two sets of the co-occurrences, according to one embodiment of the present invention.
Figure 11B:
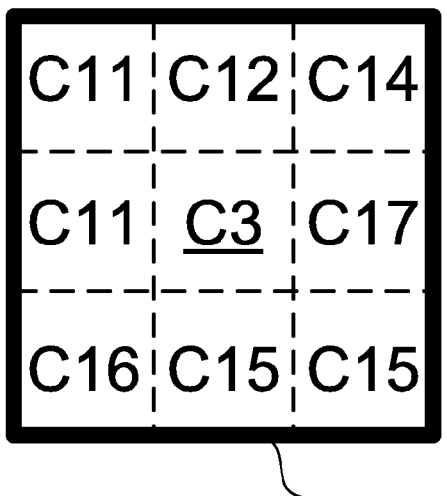

In one embodiment, the profiling and/or scoring of co-occurrences are performed only for co-occurrences in the unique groups. Co-occurrences that appear in input patterns for more than one category are not profiled or scored. FIG. 11A is a diagram illustrating co-occurrences in an expanded receptive field 1120 for which the category index of "dog" is received. FIG. 11B is a diagram illustrating co-occurrences in another expanded receptive field 1130 for which the category index of "cat" is received. The center co-occurrences for both expanded receptive field are co-occurrence C3. Because the center co-occurrence C3 is indicated by the indexes for "dog" and "cat," the co-occurrence C3 is assigned to a nonunique group, described above with reference to FIG. 6B. Because nonunique groups have only one member, grouping of co-occurrences need not be performed for co-occurrences in the nonunique groups.

Figures 12, 13:
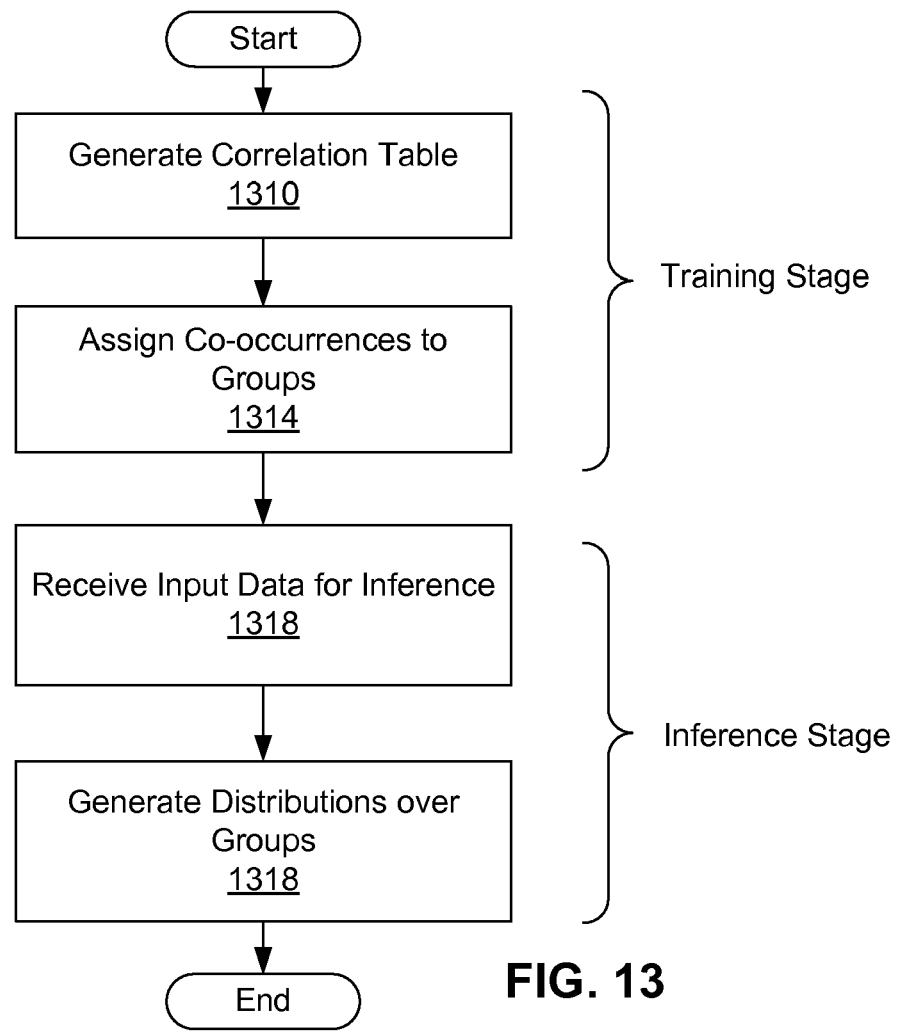
FIG. 12 is a correlation table generated by comparing the profiles of co-occurrences or scoring matching of surrounding co-occurrences of a center co-occurrence, according to one embodiment of the present invention.
FIG. 13 is a flow chart illustrating a process in a supervised learning node trained using input patterns for expanded receptive fields, according to one embodiment of the present invention.

FIG. 12 illustrates a correlation table generated by comparing the profiles of co-occurrences or scoring the matching of surrounding co-occurrences, according to one embodiment. A higher value in the entry indicates that two co-occurrences corresponding to the entry are highly correlated (i.e., the co-occurrences are likely to be surrounded by similar co-occurrences). In the example of FIG. 12, the combinations of co-occurrences C0-C1 and C3-C4 have a high correlation value of 0.9, meaning that these co-occurrences are highly correlated. Therefore, co-occurrences C0 and C1 are likely to be assigned to the same group. Likewise, co-occurrences C3 and C4 are also likely to be assigned to the same group. In contrast, co-occurrences the combinations of co-occurrences C0-C3, C1-C3, C2-C3 and C2-C4 have a low correlation value of 0.1. Therefore, co-occurrences C0-C3, C1-C3, C2-C3 and C2-C4 are unlikely to be grouped into the same groups.

After the correlation values are obtained, the co-occurrences may be grouped using various methods, including hierarchical agglomerative clustering where a co-occurrence is assigned to only one group. Referring to FIG. 12, for example, three co-occurrences C0, C1 and C2 are assigned to group G1, and two co-occurrences C3 and C4 are assigned to group G2. Note that the groups in FIG. 12 do not share any co-occurrences. Suitable clustering methods for agglomerative clustering include, among others, single linkage clustering, spectral graph partitioning and k-means clustering.

FIG. 13 is a flow chart illustrating a process in a supervised learning node for context aware training based on expanded receptive fields, according to one embodiment. First, the supervised learning node starts an inference stage by generating 1310 a correlation table based on input patterns covering an expanded receptive field, as described below in detail with reference to FIG. 14. After generating the correlation table, co-occurrences detected in the supervised learning node are assigned 1314 to groups. After co-occurrences are assigned, the supervised learning node is switched to the inference mode. In the inference mode, the supervised learning node receives sample input patterns for inference 1318. In one embodiment, the input pattern for inference covers a smaller receptive field compared to the expanded receptive field. The supervised learning node then generates 1318 distributions over previously generated groups.

Figure 14:
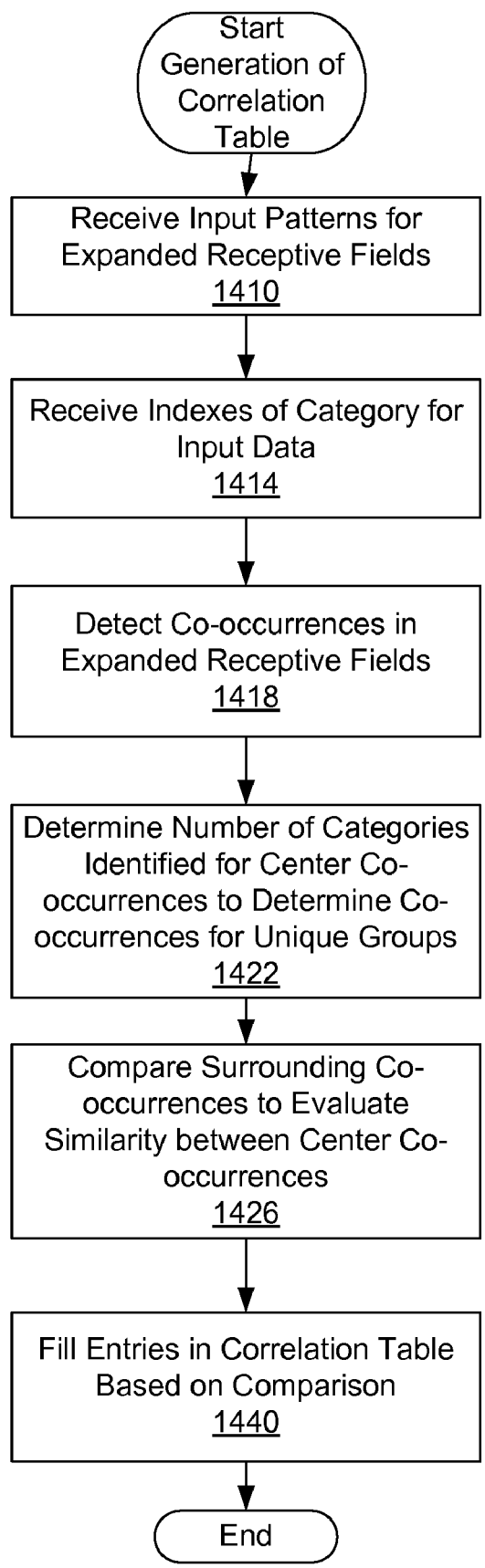
FIG. 14 is a flow chart illustrating the process of generating a correlation table, according to one embodiment of the present invention.

FIG. 14 is a flow chart illustrating the process 1310 of generating the correlation table in FIG. 13, according to one embodiment. First, the supervised learning node receives 1410 input patterns for expanded reception fields at the supervised learning node. An expanded reception field covers the center co-occurrence as well as the co-occurrences surrounding the center co-occurrence. The indexes of categories for the input patterns are also received 1414 at the supervised learning node. The co-occurrences in the input patterns are then detected 1418 at the supervised learning node.

The supervised learning node then determines 1422 how many categories were indicated for a center co-occurrence in the expanded receptive field. If more than one category was identified for a center co-occurrence in the expanded receptive field, the center co-occurrence is assigned to a nonunique group. The center co-occurrences in the nonunique groups are discarded from the correlation table, and not evaluated further. If only one category was identified for a center co-occurrence in the expanded receptive field, the process proceeds to compare 1426 surrounding co-occurrences of the center co-occurrences with surrounding co-occurrences of another center co-occurrence to evaluate and score similarity in the surrounding co-occurrences of the two co-occurrences. In one embodiment, the profiles of the center co-occurrences are compared to evaluate the similarity of neighboring co-occurrences. In another embodiment, the number of surrounding co-occurrences that match in two expanded receptive fields are scored to determine whether the two center co-occurrences in the expanded receptive fields are often surrounded by the same co-occurrences.

After comparing the surrounding co-occurrences, the entries in the correlation table are filled 1440 with values representing the similarities of surrounding co-occurrences. After filling all the entries, the process ends.

ALTERNATIVE EMBODIMENTS

In one embodiment, the supervised learning node gives weights to the distributions over categories in the inference mode based on the number of times the co-occurrences were detected in the training mode. If a co-occurrence was received multiple times for one category, this co-occurrence is more likely to be associated with the category compared to another co-occurrence that was received less frequently. A separate table weighting each co-occurrence may be generated in the training mode and then referenced in the inference mode. Co-occurrences incorrectly assigned would appear less often compared to correctly grouped co-occurrences, and therefore, incorrectly assigned co-occurrences are likely to be assigned a lower weight while correctly grouped co-occurrences are likely to be assigned a higher weight. Therefore, the effect of over-inclusive grouping of co-occurrences to unique groups may be mitigated by assigning weights to the co-occurrences in the inference mode.

In one or more embodiments, an expanded receptive field for context aware supervised learning consists of different configuration of smaller receptive fields used in the inference mode. For example, the expanded receptive field could consist of 5×5 blocks of smaller receptive fields or 7×7 blocks of smaller receptive fields. The expanded receptive fields also need not be a square and can consist of various configurations of smaller receptive fields (for example, 3×7 blocks of smaller receptive fields).

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. An Hierarchical Temporal Memory (HTM) network system comprising a top node and a supervised learning node, the top node configured to generate an output representing an object or a state of an object responsive to receiving sample input data in an inference mode, comprising:

a supervised learning node configured to receive a training input data in a training mode and group patterns in the training input data responsive to receiving a supervision signal representing a correct category of the object or the state of the object for the training input data, and the supervised learning node in the inference mode subsequent to the training mode generating first information about patterns in sample input data corresponding to the patterns grouped in the training mode, the top node in the inference mode generating the output based on the first information generated at the supervised learning node.

2. The HTM network system of claim 1, wherein the supervised learning node is further adapted to create a unique group including one or more patterns in the training input data indicated by the supervision signal as representing one category, and a nonunique group including one pattern in the training input data indicated by the supervision signal as representing two or more categories.

3. The HTM network system of claim 1, wherein the supervised learning node is configured to receives the training input data for a first receptive field in the training mode and the sample input data for a second receptive field in the inference mode, the second receptive field smaller than the first receptive field.

4. The HTM network system of claim 3, wherein the supervised learning node is configured to generating a correlation table in the training mode for a first pattern and a second pattern by comparing and scoring patterns surrounding the first pattern and the second pattern, the supervised learning node grouping the first pattern and the second pattern into a same group based on the number of matching patterns that surround the first pattern and the second pattern.

5. The HTM network system of claim 1, wherein the supervised learning node is configured to generate the first information about the patterns in sample input data based on a number of times a pattern was detected in the training input data.

6. The HTM network system of claim 1, wherein the supervised learning node is further adapted to create a unique group including one or more patterns representing one object or one state of the object but not others by assigning a pattern to the unique group responsive to the supervision signal indicating one category for the assigning pattern over a threshold percentage of times.

7. The HTM network system of claim 1, wherein the supervised learning node further comprises a temporal group learner configured to group the patterns in the training input data based on temporal proximity of the patterns in the input data, the supervised learning node configured to generate second information about patterns in sample input data corresponding to the patterns grouped by the temporal group learner, the top node in the inference mode generating the output based on the second information.

8. A computer-implemented method of determining an object or a state of an object in a supervised learning node in a Hierarchical Temporal Memory (HTM) network system, the HTM network comprising a top node, comprising:
grouping patterns in training input data responsive to receiving training input data in a training mode and a supervision signal representing a correct category of the object or the state of the object for the training input data;
generating first information about patterns in sample input data corresponding to the patterns grouped in the training mode in an inference mode subsequent to the training mode; and
sending the first information to the top node in the inference mode for generating an output representing the object or the state of the object corresponding to the input data based on the first information.

9. The method of claim 8, further comprising:
creating a unique group including one or more patterns in the training input data indicated by the supervision signal as representing one category; and
creating a nonunique group including one pattern in the training input data indicated by the supervision signal as representing two or more categories.

10. The method of claim 8, wherein the supervised learning node is configured to receives the training input data for a first receptive field in the training mode and the sample input data for a second receptive field in the inference mode, the second receptive field smaller than the first receptive field.

11. The method of claim 10, further comprising
generating a correlation table in the training mode for a first pattern and a second pattern by comparing and scoring patterns surrounding the first pattern and the second pattern; and
grouping the first pattern and the second pattern into a same group based on the number of matching patterns that surround the first pattern and the second pattern.

12. The method of claim 8, further comprising generating the first information about the patterns in sample input data based on a number of times a pattern was detected in the training input data.

13. The method of claim 8, further comprising creating a unique group including one or more patterns representing one object or one state of the object but not others by assigning a pattern to the unique group responsive to the supervision signal indicating one category for the assigning pattern over a threshold percentage of times.

14. The method of claim 8, further comprising:
grouping the patterns in the training input data based on temporal proximity of the patterns in the input data;
generating second information about patterns in sample input data corresponding to the patterns grouped based on the temporal proximity; and
sending the second information to the top node for generating the output.

15. A computer-readable storage medium storing instructions for determining an object or a state of an object in a supervised learning node in a Hierarchical Temporal Memory (HTM) network system, the instructions when executed by a processor causes the processor to
group patterns in training input data responsive to receiving training input data in a training mode and a supervision signal representing a correct category of the object or the state of the object for the training input data;
generate first information about patterns in sample input data corresponding to the patterns grouped in the training mode in an inference mode subsequent to the training mode; and
send the first information to the top node in the inference mode for generating an output representing the object or the state of the object corresponding to the input data based on the first information.

16. The computer-readable storage medium of claim 15, further comprising instructions that cause the processor to:
create a unique group including one or more patterns in the training input data indicated by the supervision signal as representing one category; and
create a nonunique group including one pattern in the training input data indicated by the supervision signal as representing two or more categories.

17. The computer-readable storage medium of claim 15, wherein the supervised learning node is configured to receives the training input data for a first receptive field in the training mode and the sample input data for a second receptive field in the inference mode, the second receptive field smaller than the first receptive field.

18. The computer-readable storage medium of claim 17, further comprising instructions that cause the processor to:
generate a correlation table in the training mode for a first pattern and a second pattern by comparing and scoring patterns surrounding the first pattern and the second pattern; and
group the first pattern and the second pattern into a same group based on the number of matching patterns that surround the first pattern and the second pattern.

19. The computer-readable storage medium of claim 15, further comprising instructions that cause the processor to generate the first information about the patterns in sample input data based on a number of times a pattern was detected in the training input data.

20. The computer-readable storage medium of claim 15, further comprising instructions causing the processor to create a unique group including one or more patterns representing one object or one state of the object but not others by assigning a pattern to the unique group responsive to the supervision signal indicating one category for the assigning pattern over a threshold percentage of times.

21. The computer-readable storage medium of claim 15, further comprising instructions causing the processor to:
group the patterns in the training input data based on temporal proximity of the patterns in the input data;
generate second information about patterns in sample input data corresponding to the patterns grouped based on the temporal proximity; and
send the second information to the top node for generating the output.

* * * * *